(12) United States Patent
Gariepy et al.

(10) Patent No.: US 8,787,753 B2
(45) Date of Patent: *Jul. 22, 2014

(54) METHOD AND SYSTEM FOR DETERMINING IN-BAND OPTICAL NOISE

(71) Applicant: Exfo Inc., Quebec (CA)

(72) Inventors: Daniel Gariepy, Quebec (CA); Gang He, Quebec (CA); Yves Breton, Quebec (CA)

(73) Assignee: Exfo Inc., Québec, QC ( * ) Notice: Subject to any disclaimer, the term of this patent is extended or adjusted under 35 U.S.C. 154(b) by 0 days.

This patent is subject to a terminal disclaimer.

(21) Appl. No.: 13/717,113

(22) Filed: Dec. 17, 2012

(65) Prior Publication Data

US 2013/0163987 A1    Jun. 27, 2013

Related U.S. Application Data

(63) Continuation of application No. 12/594,503, filed as application No. PCT/CA2008/000647 on Apr. 4, 2008, now Pat. No. 8,358,930.

(60) Provisional application No. 60/910,352, filed on Apr. 5, 2007.

(51) Int. Cl.
*H04B 10/08* (2006.01)

(52) U.S. Cl.
USPC ......... 398/26; 398/9; 398/25; 398/34; 398/38

(58) Field of Classification Search
CPC .............. H04B 10/075–10/0799; H04B 10/532
USPC ...................... 398/9, 25, 26, 34, 38
See application file for complete search history.

(56) References Cited

U.S. PATENT DOCUMENTS

| 5,430,795 A | 7/1995 | Taga et al. |
| 5,513,029 A | 4/1996 | Roberts |
| 5,654,816 A | 8/1997 | Fishman |
| 5,712,716 A | 1/1998 | Vanoli et al. |

(Continued)

FOREIGN PATENT DOCUMENTS

| WO | 2008122123 | 10/2008 |
| WO | 2009062237 | 5/2009 |

OTHER PUBLICATIONS

JDSU Corporation: "Measuring the Optical Signal-to-Noise Ratio in Agile Optical Networks", Technical Note, 2005, pp. 1-10.*

(Continued)

*Primary Examiner* — Li Liu
(74) *Attorney, Agent, or Firm* — Norton Rose Fulbright Canada, LLP; Alexandre Dacust

(57) ABSTRACT

There is provided a method for determining the in-band noise in agile multichannel Dense Wavelength Division Multiplexing (DWDM) optical systems, where the interchannel noise is not representative of the in-band noise in the optical channel. The method relies on the analysis of two observations of the same input optical signal. In the two observations, the linear relationship between the optical signal contribution and the optical noise contribution (e.g. the observed OSNR) is different, which allows the discrimination of the signal and noise contributions in the input optical signal. In a first approach, the two observations are provided by polarization analysis of the input optical signal. In a second, the input optical signal is obtained using two different integration widths.

18 Claims, 13 Drawing Sheets

(56) References Cited

U.S. PATENT DOCUMENTS

| | | | |
|---|---|---|---|
| 5,790,289 | A | 8/1998 | Taga et al. |
| 6,271,945 | B1 | 8/2001 | Terahara |
| 6,347,169 | B1 | 2/2002 | Kang et al. |
| 6,362,874 | B1 | 3/2002 | Madsen |
| 6,396,051 | B1 | 5/2002 | Li et al. |
| 6,480,637 | B1 | 11/2002 | Yao |
| 6,504,604 | B1 | 1/2003 | Holland |
| 6,591,024 | B2 | 7/2003 | Westbrook |
| 6,636,306 | B2 | 10/2003 | He et al. |
| 6,654,561 | B1 | 11/2003 | Terahara et al. |
| 6,813,021 | B2 | 11/2004 | Chung et al. |
| 7,068,412 | B2 | 6/2006 | Fujiwara et al. |
| 7,106,443 | B2 | 9/2006 | Wein et al. |
| 7,146,099 | B2 | 12/2006 | Kamalov et al. |
| 7,149,407 | B1 | 12/2006 | Doerr et al. |
| 7,149,428 | B2 | 12/2006 | Chung et al. |
| 7,542,674 | B1 | 6/2009 | Barozzi et al. |
| 7,756,369 | B2 | 7/2010 | Rudolph et al. |
| 8,073,325 | B2 | 12/2011 | Goto |
| 8,358,930 | B2 * | 1/2013 | Gariepy et al. ............ 398/26 |
| 8,364,034 | B2 * | 1/2013 | He et al. ............ 398/25 |
| 2001/0052981 | A1 | 12/2001 | Chung et al. |
| 2002/0053677 | A1 | 5/2002 | Sarathy et al. |
| 2002/0154353 | A1 | 10/2002 | Heath et al. |
| 2002/0190261 | A1 | 12/2002 | Sarathy et al. |
| 2003/0020899 | A1 | 1/2003 | Stolte et al. |
| 2003/0030859 | A1 | 2/2003 | Youn et al. |
| 2003/0090755 | A1 | 5/2003 | Chung et al. |
| 2003/0174312 | A1 | 9/2003 | Leblanc |
| 2003/0219250 | A1* | 11/2003 | Wein et al. ............ 398/26 |
| 2004/0067057 | A1 | 4/2004 | Akiyama et al. |
| 2004/0114923 | A1* | 6/2004 | Chung et al. ............ 398/26 |
| 2004/0136636 | A1 | 7/2004 | Rogers |
| 2004/0156632 | A1 | 8/2004 | Lee et al. |
| 2004/0174517 | A1 | 9/2004 | Brendel |
| 2005/0031341 | A1 | 2/2005 | Stuart |
| 2005/0094130 | A1 | 5/2005 | Han et al. |
| 2006/0051087 | A1 | 3/2006 | Martin et al. |
| 2006/0098980 | A1 | 5/2006 | Lee et al. |
| 2007/0280689 | A1 | 12/2007 | Boffi et al. |
| 2007/0297043 | A1 | 12/2007 | Kao et al. |
| 2008/0124076 | A1 | 5/2008 | Rudolph et al. |
| 2008/0205886 | A1 | 8/2008 | Anderson et al. |
| 2010/0028008 | A1 | 2/2010 | Nakajima |
| 2010/0129074 | A1 | 5/2010 | Gariepy et al. |
| 2010/0226661 | A1 | 9/2010 | Hiraizumi |

OTHER PUBLICATIONS

Gariepy et al: "Measuring OSNR in WDM Systems-Effects of Resolution Bandwidth and Optical Rejection Ratio", Application Note 098, Jul. 3, 2003, pp. 1-16.*

J. H. Lee et al., "OSNR Monitoring Technique Using Polarization-Nulling Method", IEEE Photonics Technology Letters, vol. 13, No. 1, Jan. 2001.

Audet, Francis, "Commissioning RoadMs", Application Note 169, EXFO Electro-Optical Engineering, Inc., available at http://documents.exfo.com/appnotes/anote169-2ang.pdf on Sep. 14, 2007, 6 pages.

Gariepy Daniel and Gang He, "Measuring OSNR in WDM Systems—Effects of Resolution Bandwidth and Optical Rejection Ratio", Application Note 098, Exfo Electro-Optical Engineering Inc. available at http://documents.exfo.com/appnotes/anote098-ang.pdf on Jul. 3, 2003, 16 pages.

JDSU Uniphase Corporation, "Measuring the Optical Signal-to-Noise Ration in Agile Optical Networks", Technical Note, available at http://www.jdsu.com/product-literature/AON_tn_fop_tm_ae.pdf, 2005, pp. 1-10.

Jung, D.K. et al., "OSNR monitoring technique using polarization-mulling method", Optical Fiber Communication Conference, 2000, vol. 2, pp. 176-178, WK4-1-WK4-3.

Lee, J.H. et al., "An Improved OSNR Monitoring Technique based on Polarization-Nulling Method", Optical Fiber Communication Conference and Exhibit, 2001, vol. 2, pp. tuP6-1-tuP6-3.

International Standard, IEC 61280-2-9, Edition 1.0, Fibre optic communication subsystem test procedures—Part 2-9: Digital systems—Optical signal-to-noise ratio measurement for dense wavelength-division multiplexed systems, International Electrotechnical Commission, Oct. 29, 2002.

Gang H. et al., 2009, "Measuring the In-Band Signal-to-Noise Ratio Within Narrow Optical Channels.", Technical Note 038, EXFO Electro-Optical Engineering Inc., 8 pages.

Moench W. et al., 2007, "Measuring the Optical Signal-to-Noise ratio in Agile Optical Networks.", Optical Fiber Communication and the National Fiber Optic Engineers Conference, OFC/NFOEC, Anaheim, CA, 6 pages.

Tian X. et al., 2006, "Precise In-Band OSNR and Spectrum Monitoring Using High-Resolution Swept Coherent Detection.", IEEE Photonics Technology Letters, vol. 18, No. 1, pp. 145-147.

Skold M. et al., 2005, "PMD-Insensitive DOP-based OSNR Monitoring by Spectral SOP Measurements.", Technical Digest of Optical Fiber Communication Conference OFC/NFOEC 2005, 3 pages.

Petersson M. et al., 2002, "Multi-Channel OSNR Monitoring for WDM Networks.", 28th European Conference on Optival Communication ECOC 2002, Copenhagen, 2 pages.

Bakaul M., 2008, "Low-Cost PMD-Insensitive and Dispersion Tolerant In-Band OSNR Monitor Based on Uncorrelated Beat Noise Measurement.", IEEE Photonics Technology Letters, vol. 20, No. 11, pp. 906-908.

JDSU, "In-Service Measurement of the OSNR in ROADM-based Networks", ECOC Conference 2007, Poster Session P118.

Moench, W. and Larikova, J., "Measuring the Optical Signal-to-Noise Ratio in Agile Optical Networks", OFC/NFOEC Conference 2007, Paper NFOEC-NWC1.

* cited by examiner

FIG_5

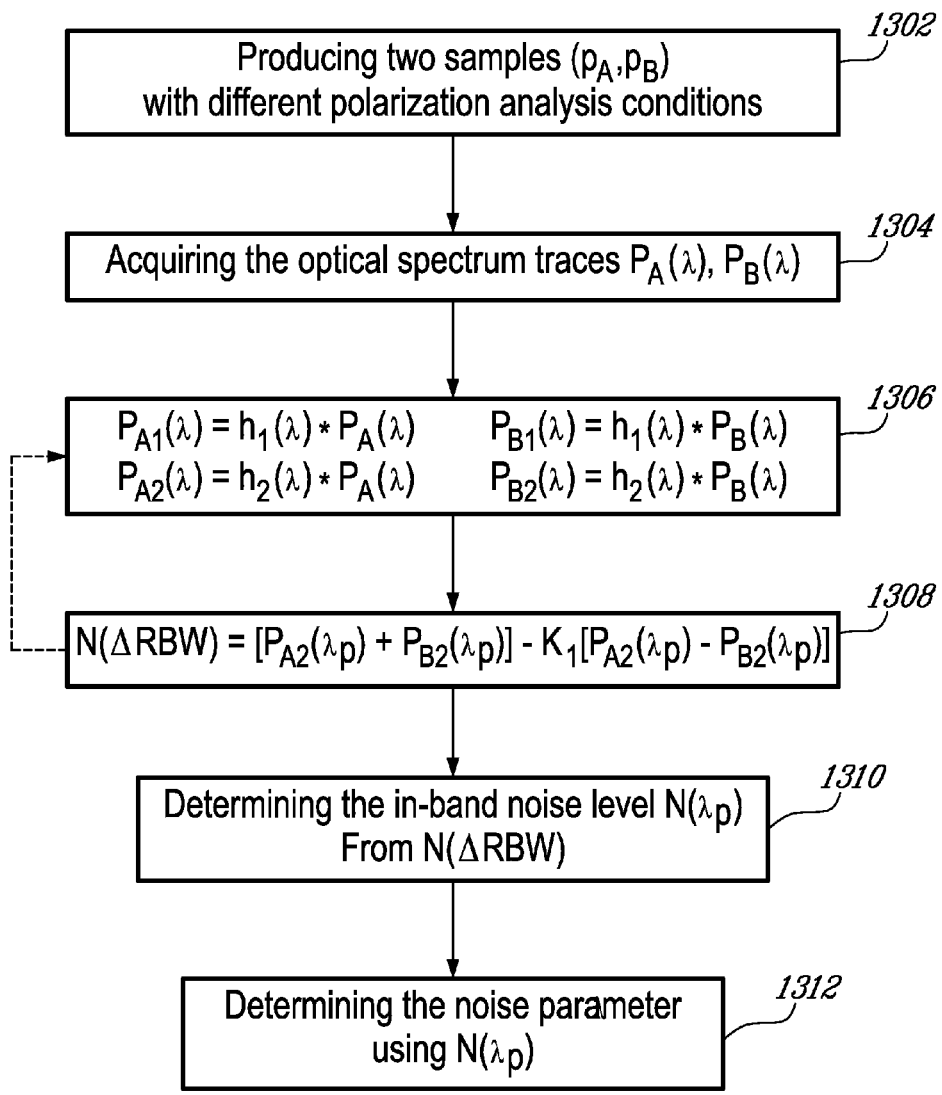

METHOD AND SYSTEM FOR DETERMINING IN-BAND OPTICAL NOISE

CROSS-REFERENCE TO RELATED APPLICATIONS

This application is a continuation of U.S. patent application Ser. No. 12/594,503, now pending, which is a national stage entry of PCT/CA2008/000647 filed Apr. 4, 2008, the specification of which being hereby incorporated by reference. This application claims priority of U.S. provisional patent application no. 60/910,352 filed Apr. 5, 2007, the specification of which being hereby incorporated by reference.

TECHNICAL FIELD

The invention relates to the determination of the in-band noise in optical telecommunication applications. More specifically, the invention relates to the determination of the in-band noise in Dense Wavelength Division Multiplexing (DWDM) optical networks.

BACKGROUND

The IEC 61280-2-9 Fiber-optic communication subsystem test procedures—Part 2-9 standards (ed. 1.0 b:2002) provides a standard method for determining OSNR in DWDM networks. This method is based on the assumption that the interchannel noise level is representative of the noise level at the signal peak position. The method interpolates the power level of the noise outside the signal bandwidth to evaluate the in-band noise in the signal bandwidth. Increased modulation rates, which enlarge the signal bandwidth, and increased channel density reduce the interchannel width, therefore resulting in severe spectral characteristics requirements for the optical spectrum analyzers used to perform the measurement. The procedures described in the standards are able to cope with these difficulties when the noise level of adjacent peaks is mostly continuous. For example, the standards propose a two-scan procedure to first measure a broad modulated peak with a larger resolution bandwidth to capture the entire signal peak and then determine the noise using a narrow resolution bandwidth to minimize the contributions of the main and adjacent peaks on the interchannel noise level. Alternatively, commercial Optical Spectrum Analyzers (OSA) (such as EXFO's FTB-5240, in its versions available before 2007) implement a somewhat equivalent procedure by performing an integrated peak calculation and fine noise determination in a single scan.

However, to strictly comply with the standards recommendation, the noise level should be determined at the mid-channel spacing between peaks. In the case where noise is spectrally filtered with the signal peak, after passing through multiplexers or demultiplexers—such as Reconfigurable Optical Add Drop Multiplexers (ROADM)—the mid-spacing noise level is no longer representative of the in-band noise level, which is the relevant parameter for the OSNR determination. The interpolation of the interchannel noise level becomes unreliable. This can be mitigated by relying on a very sharp spectral response of the OSA filter and adaptive processing to determine the noise level at the shoulders where the noise meets the base of a signal peak within the channel bandwidth. However, increased modulation rates combined with narrow filtering of multiplexers and demultiplexers is making it increasingly difficult to achieve a reliable measurement of the noise level within the channel bandwidth.

Active polarization nulling (see J. H. Lee et al., "OSNR Monitoring Technique Using Polarization-Nulling Method", IEEE Photonics Technology Letters, Vol. 13, No. 1, January 2001) provides an alternative to a direct analysis of the optical spectrum. This method uses the fact that the signal peak is generally polarized while the noise is generally unpolarized. Using a polarization controller cascaded with a polarizer, it is possible to actively control the polarization of the input signal in order to find a condition where the signal peak is substantially suppressed by the polarizer. An optical spectrum trace is acquired while the signal peak is suppressed and reveals the in-band noise within the optical channel bandwidth, discriminated from the signal peak by the signal peak suppression. The noise level within the optical channel bandwidth can be determined using the acquired optical spectrum trace.

Other methods for determining the OSNR of an optical signal have also been proposed. One of them is disclosed in U.S. Patent Application Pub. No. 2006/0098980 to Lee et al. This method uses a dithering function for measuring the noise and the signal simultaneously using a different resolution bandwidth and in a single measurement step, as opposed to the IEC method where the measurement is done in two optical spectrum scans.

SUMMARY

There is provided a method for determining a noise parameter, such as the in-band noise or the Optical Signal-to-Noise Ratio (OSNR), of a Dense Wavelength Division Multiplexing (DWDM) input optical signal having a signal and a noise contribution within an optical signal bandwidth. The method can be implemented with only passive optical devices and a commercially available optical spectrum analyzer (OSA), as opposed to actively controlled polarization controllers. At least two optical spectrum traces of the input optical signal obtained by the OSA are processed to discriminate the noise contribution from the signal contribution.

The method is particularly valuable for determining the in-band noise and thus the OSNR in agile multichannel Dense Wavelength Division Multiplexing (DWDM) optical systems. In such agile systems, optical channels may be added or dropped anywhere along an optical network, after or before being optically amplified. Adding and dropping is typically performed using Optical Add Drop Multiplexers (OADM) which not only filter the signal peak corresponding to the optical channel but also filter the noise. The optical noise is filtered with the useful signal peak and is consequently spectrally limited to the channel bandwidth or spectral neighborhood of the optical channel and also varies from one DWDM channel to another. The interchannel noise is therefore not representative of the in-band noise of the optical channel.

The method relies on the analysis of at least two measurements of the same input optical signal which has a useful signal contribution (corresponding to the signal peak) and a noise contribution. In the two measurements, the linear relationship between the signal contribution and the noise contribution, i.e. the observed OSNR, is different which allows the discrimination of the signal and noise contributions in the input optical signal using calculations and a comparison between the two measurements. In a first approach presented herein and which will be referred to as the Passive Polarization-Induced Discrimination (PPID) approach, the two measurements are provided by different polarization analysis of the input optical signal. At least two samples of the input optical signal are taken under different polarization analysis conditions, e.g. polarized according to a different state of polarization (SOP), the optical spectrum of which being acquired to provide the at least two measurements. In one example of this approach, the input optical signal is split using a polarization beam splitter and the two split samples are acquired to provide the two measurements. In a second approach presented herein and referred to as the Differential Resolution Bandwidth Discrimination (DRBD) approach, the input optical signal is acquired using two different Resolution Bandwidths (RBW's). The different RBW's may be provided using a different filtering slit in the Optical Spectrum Analyzer (OSA) or a single acquired input trace may by integrated numerically to provide the two measurements.

The PPID and the DRBD approaches have some different advantages and drawbacks and can be combined into a hybrid approach where limitations of one are circumvented by using the other.

The method relies on the differential properties of the noise and signal contributions in the input optical signal to be analyzed. Firstly, the signal and noise contributions have different properties in that the signal is typically substantially polarized (or at least partially polarized) where the noise is typically unpolarized (or at least partially unpolarized). The PPID approach takes advantage of this characteristic. Accordingly, the insertion of a polarizer in the optical path of the input optical signal will have a different effect on the noise contribution than on the signal contribution. It is thus possible to provide different optical spectrum traces with different proportions of signal and noise contributions, which allows for their discrimination by assuming that the noise contribution is mostly unpolarized while the signal contribution is mostly polarized. Secondly, the noise contribution is typically spectrally broader than the signal contribution, and more importantly, it varies slowly where the signal varies quickly as compared to the resolution bandwidth of the OSA. The DRBD approach takes advantage of this second characteristic. Accordingly, varying the RBW in different optical spectrum traces of the input optical signal will have a different effect on the noise contribution than on the signal contribution. It is thus possible to provide different optical spectrum traces with different proportions of signal and noise contributions, which allows for their discrimination.

According to one aspect, there is provided a method for determining a noise parameter on an input optical signal having a data-carrying signal contribution and a noise contribution within an optical signal bandwidth. The method comprises: obtaining at least two optical spectrum traces from said input optical signal, said optical spectrum traces being taken under different conditions such that they exhibit different non-zero signal-to-noise ratios; mathematically discriminating said signal contribution from said noise contribution within said optical signal bandwidth using said optical spectrum traces; determining an in-band noise level on said input optical signal from the discriminated noise contribution; determining the noise parameter from the determined in-band noise level, the noise parameter being indicative of the noise contribution within the optical signal bandwidth; wherein the signal contribution and the noise contribution have mutually different degrees of polarization and wherein said obtaining at least two optical spectrum traces under different conditions comprises: producing at least two samples of the input optical signal under respective different polarization analysis conditions, said polarization analysis conditions corresponding to the at least two samples being arbitrary relative to said data-carrying signal contribution such that the data-carrying signal contribution is not substantially suppressed on any of said at least two samples, said at least two samples exhibiting mutually different non-zero signal-to-noise ratios; and acquiring an optical spectrum of each one of the at least two samples to obtain said optical spectrum traces; wherein said discriminating comprises: calculating, from said optical spectrum traces, a difference optical spectrum substantially indicative of said data-carrying signal contribution; and solving for said noise contribution using said optical spectrum traces and said difference optical spectrum.

According to another aspect, there is provided a method for determining a noise parameter on an input optical signal having a data-carrying signal contribution and a noise contribution within an optical signal bandwidth, said signal contribution being mostly polarized and said noise contribution being mostly unpolarized. The method comprising: acquiring a first and a second optical spectrum trace of the input optical signal corresponding to respective first and second polarization analysis conditions, said first and second polarization analysis conditions being mutually different and arbitrary relative to said data-carrying signal contribution such that the data-carrying signal contribution is not substantially suppressed on any of the optical spectrum traces, said optical spectrum traces exhibiting mutually different non-zero signal-to-noise ratios; mathematically discriminating said signal contribution from said noise contribution within said optical signal bandwidth based on said optical spectrum traces, said discriminating comprising: calculating, from said optical spectrum traces, a difference optical spectrum substantially indicative of said data-carrying signal contribution; and solving for said noise contribution using said optical spectrum traces and said difference optical spectrum; and determining said noise parameter from the discriminated noise contribution, the noise parameter being indicative of the noise contribution within the optical signal bandwidth.

According to another aspect, there is provided a system for determining a noise parameter on an input optical signal within an optical signal bandwidth. The system comprising: an input for receiving said input optical signal comprising a data-carrying signal contribution and a noise contribution within said optical signal bandwidth, said signal contribution and said noise contribution having mutually different degrees of polarization; a polarization optics arrangement for obtaining a first and a second sample of the input optical signal under mutually different polarization analysis conditions such that at least one of the first and the second sample is polarization analyzed, a state of polarization of the at least one polarization analyzed sample being arbitrary relative to a state of polarization of the data-carrying signal contribution such that the data-carrying signal contribution is not substantially suppressed on any of said first and said second sample; an optical spectrum analyzer for acquiring a first and a second optical spectrum trace respectively of the first and second samples, the first and second optical spectrum traces exhibiting mutually different non-zero signal-to-noise ratios; a spectrum processor adapted for mathematically discriminating said noise contribution in said input optical signal within said optical signal bandwidth based on said first and second optical spectrum traces, said spectrum processor comprising: a differentiator for calculating, from said optical spectrum traces, a difference optical spectrum substantially indicative of said signal contribution; and a noise solver for evaluating said noise contribution using calculations involving said optical spectrum traces and said difference optical spectrum; and a noise calculator for evaluating said noise parameter within the optical signal bandwidth from the discriminated noise contribution.

According to another aspect, there is provided a method for determining a noise parameter on an input optical signal having a data-carrying signal contribution and a noise contribution within an optical signal bandwidth, the noise contribution varying slowly in wavelength within the optical signal bandwidth compared to the signal contribution. The method comprises the steps of: obtaining a first and a second optical spectrum traces from the input optical signal, respectively corresponding to a first and a second integration widths in order for the first and the second optical spectrum traces to show different non-zero signal-to-noise ratios, the second integration width being larger than the first integration width, the first and the second optical spectrum traces comprising at least one point; mathematically discriminating the noise contribution in the input optical signal within the optical signal bandwidth using the first and the second optical spectrum traces; determining, from the discriminated noise contribution, an in-band noise level on the input optical signal within the optical signal bandwidth; and determining the noise parameter from the determined in-band noise level, the noise parameter being indicative of the noise contribution within the optical signal bandwidth.

According to another aspect, there is provided a method for determining an in-band noise level on an input optical signal having a data-carrying signal contribution and a noise contribution within an optical signal bandwidth, wherein an optical spectrum trace is obtained from the input optical signal, and wherein the noise contribution is discriminated from the signal contribution within the optical signal bandwidth in order to determine an in-band noise level on the input optical signal. The method is characterized in that: at least two optical spectrum traces are obtained from the input optical signal, the optical spectrum traces being taken under different conditions such that they show different non-zero signal to noise ratios; the noise contribution is discriminated from the signal contribution within the optical signal bandwidth using a comparison between the optical spectrum traces; and the in-band noise level on the input optical signal is determined from the discriminated noise contribution.

According to another aspect, there is provided a method for determining an in-band noise level on an input optical signal having a data-carrying signal contribution and a noise contribution within an optical signal bandwidth, wherein the signal contribution and the noise contribution have at least one of different degrees of polarization and different states of polarization from one another, wherein a first optical spectrum trace of the input optical signal is acquired using a first polarization analysis condition, and wherein the noise contribution is discriminated from the signal contribution within the optical signal bandwidth in order to determine an in-band noise level on the input optical signal. The method is characterized by the steps of: acquiring a second optical spectrum trace of the input optical signal using a second polarization analysis condition, the first and second polarization analysis conditions being different from one another and each being arbitrary relative to the input optical signal, the optical spectrum traces showing different signal to noise ratios; mathematically discriminating the noise contribution from the signal contribution within the optical signal bandwidth using a comparison between the optical spectrum traces; and determining the in-band noise level on the input optical signal from the discriminated noise contribution.

According to another aspect, there is provided a system for determining the in-band noise level on an input optical signal having a data-carrying signal contribution and a noise contribution within an optical signal bandwidth, wherein the signal contribution and the noise contribution have at least one of different degrees of polarization and different states of polarization from one another, the system comprising a polarization optics arrangement for polarizing at least part of the input optical signal in order to produce a first sample of the input optical signal, an optical spectrum analyzer configured for acquiring a first optical spectrum trace of the first sample, the noise contribution being discriminated from the signal contribution within the optical signal bandwidth in order to determine an in-band noise level on the input optical signal. The system is characterized in that: the first optical spectrum trace shows a non-zero signal to noise ratio; the polarization optics arrangement is further arranged to produce a second sample of the input optical signal, the first and the second samples having states of polarization relative to the input optical signal different from one another or degrees of polarization different from one another, states of polarization of the first and the second samples being arbitrary relative to the input optical signal; the optical spectrum analyzer is further configured for acquiring a second optical spectrum trace of the second sample, the second optical spectrum trace showing a non-zero signal to noise ratio different from the one of the first optical spectrum trace; the system also comprises a spectrum processor for mathematically discriminating the noise contribution from the signal contribution within the optical signal bandwidth based on the first and the second optical spectrum traces; and a noise calculator for determining the in-band noise within the optical signal bandwidth from the discriminated noise contribution.

According to another aspect, there is provided a method for estimating an in-band noise level on an input optical signal having a data-carrying signal contribution and a noise contribution within an optical signal bandwidth, wherein the noise contribution varies slowly in wavelength within the optical signal bandwidth compared to the signal contribution, and wherein a first and a second optical spectrum traces are obtained from the input optical signal respectively corresponding to a first and a second integration widths, the second integration width being larger than the first integration width. The method is characterized in that : the first and the second optical spectrum traces show different non-zero signal to noise ratios due to the different integration widths; the noise contribution is discriminated from the signal contribution within the optical signal bandwidth using numerical calculations based on the the first and the second optical spectrum traces; and the in-band noise level on the input optical signal is determined from the discriminated noise contribution.

BRIEF DESCRIPTION OF THE DRAWINGS

FIG. 13 is a flow chart illustrating an example method for determining noise parameter on an input optical signal using a hybrid approach.

It will be noted that throughout the appended drawings, like features are identified by like reference numerals.

DETAILED DESCRIPTION

Figure 1:
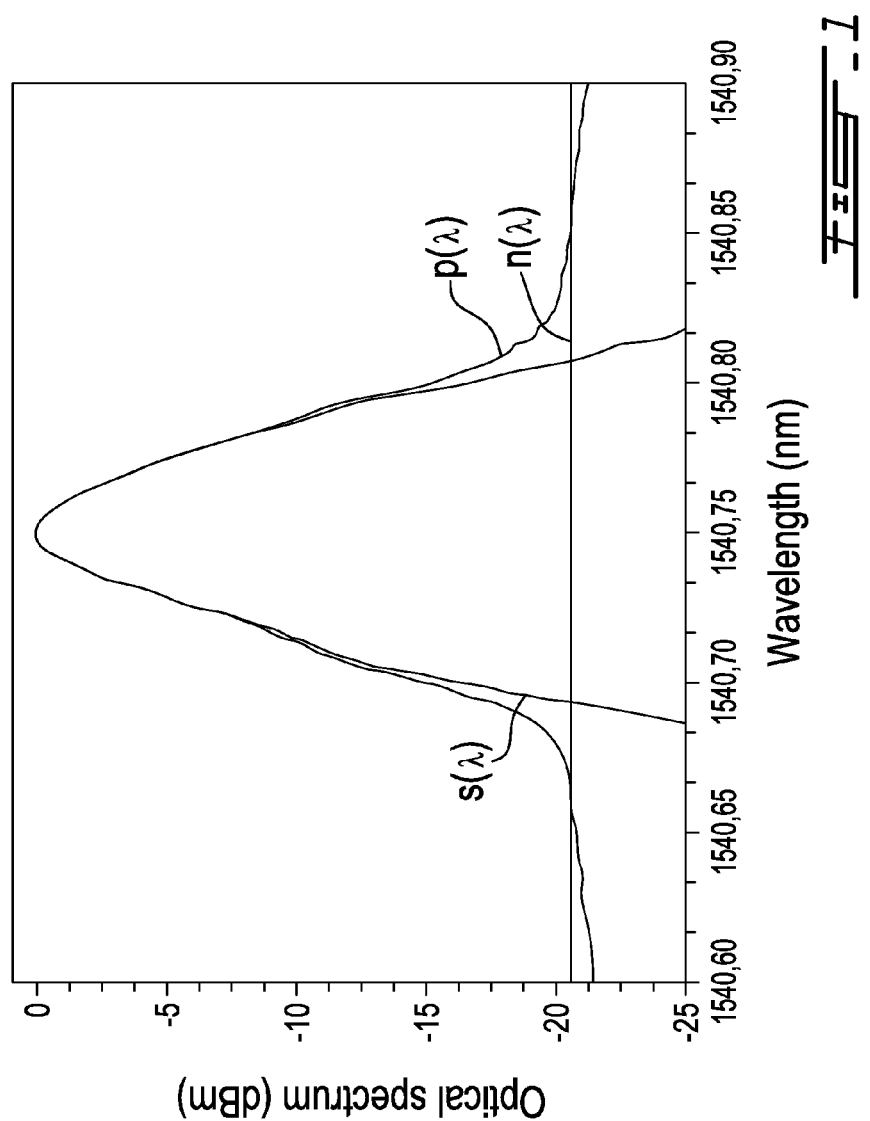
FIG. 1 is a graph illustrating the optical spectrum of an example input optical signal along with the optical spectrum of its noise contribution and of its signal contribution.

Now referring to FIG. 1, the methods and systems described herein relate to the characterization of an optical signal p which is used in optical telecommunications to transmit data over a Dense Wavelength Division Multiplexing (DWDM) optical channel. Throughout the present description, the optical signal p corresponds to one of the DWDM optical channels. In the optical channel bandwidth of interest, the optical signal p includes two components, i.e. a signal contribution s arising from the data-carrying signal, and a noise contribution n which includes all other sources of optical power within the optical channel. The noise contribution n arises mostly from the Amplified Spontaneous Emission (ASE) noise of the optical amplifiers in the optical transmission system. FIG. 1 shows the optical spectrum $p(\lambda)$ of an example optical signal p, along with the optical spectrum of its signal contribution $s(\lambda)$ and the optical spectrum of its noise contribution $n(\lambda)$, such that:

$$p(\lambda) = s(\lambda) + n(\lambda),$$

and $$p = \int_{CBW} p(\lambda),$$

$$s = \int_{CBW} s(\lambda),$$

$$n = \int_{CBW} n(\lambda), \quad (1)$$

and where CBW is the Channel BandWidth of interest.

An optical spectrum trace of the optical signal p is acquired by an Optical Spectrum Analyzer (OSA) as a series of data pairs $P(\lambda)$ and represents the input optical signal p convolved with the filter spectral response of the OSA $h_{OSA}(\lambda)$ combined with any desired convolution window $h_W(\lambda)$. The optical spectrum trace $P(\lambda)$ is thus the spectrally-resolved optical power of the optical signal p. In a bandwidth corresponding to the channel bandwidth CBW, the optical spectrum trace $P(\lambda)$ also includes a signal contribution $S(\lambda)$ and a noise contribution $N(\lambda)$ which are merged together and appear as the optical spectrum trace $P(\lambda)$, and:

$$\begin{aligned} P(\lambda) &= S(\lambda) + N(\lambda) \\ &= h_w(\lambda) * h_{OSA}(\lambda) * p(\lambda) \\ &= h_w(\lambda) * h_{OSA}(\lambda) * s(\lambda) + h_w(\lambda) * h_{OSA}(\lambda) * n(\lambda). \end{aligned} \quad (2)$$

where $h_w(\lambda)$ is a convolution window which may be applied numerically and "*" denotes the convolution operation.

The methods and systems described herein are used to discriminate the signal contribution $s(\lambda)$ from the noise contribution $n(\lambda)$ in the optical spectrum $p(\lambda)$ using acquired optical spectrum traces $P(\lambda)$ in order to determine the in-band noise on the optical signal to be characterized. The instrument noise associated with the detection system itself, namely the OSA, on the acquired optical spectrum trace $P(\lambda)$ is considered to have a negligible effect compared to the optical noise contribution to be characterized.

FIG. 1 shows a single optical signal p within its corresponding optical channel but it should be noted that according to wavelength division multiplexing a plurality of optical channels shares the optical spectrum, each channel for transmitting one optical signal (not shown). It should however be kept in mind that other optical signals are typically present in the optical spectrum, spectrally on both sides of the optical signal p.

A DWDM optical channel is being defined as a spectral bandwidth, i.e. the channel bandwidth, allocated for the transmission of an optical signal in a WDM transmission scheme. The signal bandwidth is rather the actual width of the signal peak, i.e. the bandwidth over which the signal contribution is non negligible. The channel bandwidth CBW may be larger than or just as large as (over even narrower than) the signal bandwidth, depending on the density of the DWDM channels and the signal transmission rate for a given transmission scheme.

The methods disclosed herein rely on the fact that the properties of the signal and noise contributions within the optical channel are different. First, the signal s and noise n contributions have different polarization properties. The signal contribution s is substantially polarized (or at least partially polarized) while the noise contribution n is mostly unpolarized (or at least partially unpolarized). Second, the noise contribution n is spectrally broader and varies slowly compared to the signal contribution p in a spectral slice corresponding to at least the Resolution BandWidth (RBW) defined by the filter spectral response of the OSA. It is possible to use at least one of these different properties to discriminate the signals from the noise contribution n in acquired optical spectrum traces $P(\lambda)$.

Figure 2:
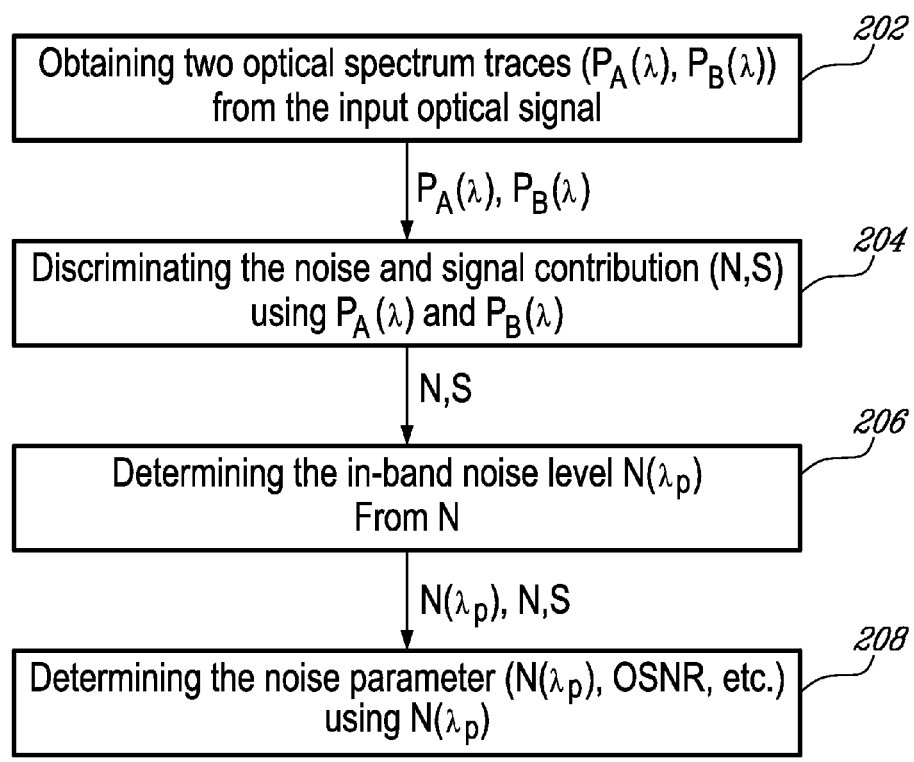
FIG. 2 is a flow chart illustrating a general method for determining the in-band noise, the Optical Signal to Noise Ratio (OSNR) or another noise parameter on an input optical signal.

FIG. 2 illustrates the general approach for determining the in-band noise, the Optical Signal to Noise Ratio (OSNR) or another noise parameter on the input optical signal p.

In step 202, at least two optical spectrum trace measurements $P_A(\lambda)$ and $P_B(\lambda)$ are obtained from the input optical signal p to be characterized. The two traces $P_A(\lambda)$, $P_B(\lambda)$ are taken on two different conditions such that the linear relationship between the signal contribution and the noise contribution, i.e. the observed OSNR, is different on both traces. This allows for the discrimination of the signal and noise contributions in the input optical signal p. As will be explained in more detail when describing the approaches below, the difference between the two traces $P_A(\lambda)$, $P_B(\lambda)$ arises from the difference in the optical properties of the signal and the noise contributions, combined with the different conditions on which the optical spectrum traces $P_A(\lambda)$ and $P_B(\lambda)$ are obtained.

In step 204, the signal contribution S and the noise contribution N are discriminated from one another in the optical bandwidth of interest using calculations and a comparison between said optical spectrum traces $P_A(\lambda)$ and $P_B(\lambda)$. Examples of such calculations that allow signal and noise discrimination are given herein below. Such calculations take into account the difference in properties between the signal and the noise contributions in order to eliminate one or the other in a combination or comparison between the obtained optical spectrum traces $P_A(\lambda)$ and $P_B(\lambda)$. It is noted that more than two traces could also be obtained and used in these calculations.

In step 206, the in-band noise level $N(\lambda_p)$ under the signal peak is determined from the discriminated noise contribution N. Again, example embodiments for this step are described in more details herein below.

In step 208, the noise parameter is determined, by calculations, from the determined in-band noise $N(\lambda_p)$. The noise parameter is indicative of the noise contribution n within the optical signal bandwidth SB, such as the determined in-band noise level $N(\lambda_p)$ itself or the OSNR calculated from the determined in-band noise level. The noise parameter is typically output for use in monitoring, installation, commission, maintenance or troubleshooting of a DWDM optical system. It can be graphically or numerically output using a display unit or a printer for example. It can also be output by generating an electrical signal or by storing it in memory for later retrieval.

Two different approaches for determining the in-band noise or the OSNR of an input optical signal p in a DWDM optical system are provided. The first approach will be referred to as the Passive Polarization-Induced Discrimination approach (PPID) and the second as the Differential Resolution Bandwidth Discrimination (DRBD) approach. The two approaches have some different advantages and drawbacks and can be combined into a hybrid approach where deficiencies of one can be circumvented by using the other.

Passive Polarization-Induced Discrimination Approach (PPID)

Referring to FIG. 1, let $p(\lambda)$ be the optical spectrum of the input optical signal p and having a signal contribution $s(\lambda)$ and a noise contribution $n(\lambda)$.

The PPID approach uses the differential properties between the signal contribution $s(\lambda)$ and the noise contribution $n(\lambda)$ in the input optical signal to be analyzed. The signal $s(\lambda)$ and noise $n(\lambda)$ contributions have different polarization properties in that the signal is typically substantially polarized, but at least partially polarized, where the noise is typically unpolarized, or at least partially unpolarized. In other words, the signal and the noise contributions have different degrees of polarization from one another. This last condition will be assumed for the following description. It is noted, however, that a similar method could also be used if the signal and noise contributions rather had different states of polarization from one another.

Figure 3:
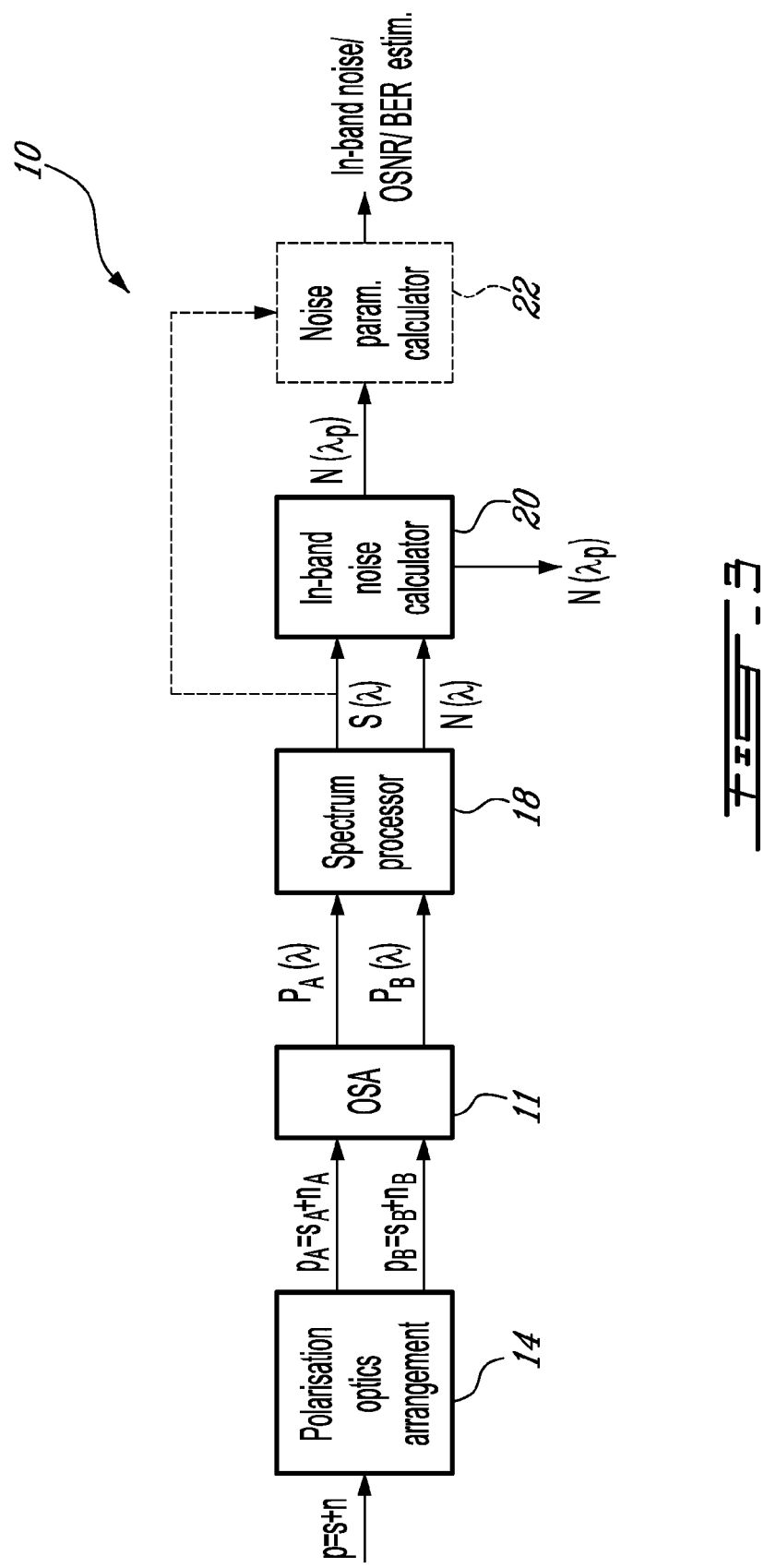
FIG. 3 is a block diagram of the main components of a system for determining a noise parameter on an input optical signal using a passive polarization-induced discrimination method.

A system 10 for determining a noise parameter on the input optical signal p is shown on FIG. 3. The system receives the input optical signal p to be characterized. Due to the different polarization properties of the signal s and the noise n contribution, the insertion of a polarization optics arrangement 14 in the optical path of the input optical signal p has a different effect on the noise contribution n than on the signal contribution s. The polarization optics arrangement 14 is used to obtain two different samples $p_A$ and $p_B$ of the input optical signal p by applying two different polarization analysis conditions. Different possible polarization optics arrangements 14 are shown in FIGS. 4A-4D and are described below.

An OSA 11 acquires the optical spectrum traces $P_A(\lambda)$ and $P_B(\lambda)$ respectively of the two samples $p_A$ and $p_B$. As a consequence of the different polarization analysis conditions between the two samples $p_A$ and $p_B$, the acquired traces $P_A(\lambda)$ and $P_B(\lambda)$ show different OSNRs. It is noted that in the special case where the OSNR is null on one of the acquired traces, i.e. the signal is completely suppressed, the following method is also applicable.

A spectrum processor 18 receives the two traces $P_A(\lambda)$, $P_B(\lambda)$ and discriminates the noise contribution n and the signal contribution s. As will be described hereinbelow, the discrimination is typically performed by subtracting the traces from one another to remove the noise contribution and provide a difference optical spectrum substantially proportional to the spectrum of the signal contribution and from which the optical spectrum of the signal $S(\lambda)$, and thus the optical spectrum of the noise $N(\lambda)$ can be estimated. It should be noted that a linear processing, such as filtering, linear transformation into another domain, etc., can be applied to the original traces $P_A(\lambda)$, $P_B(\lambda)$ before applying the herein presented processing. A noise calculator 20 evaluates the in-band noise $N(\lambda_p)$ from the discriminated optical noise $N(\lambda)$. The OSNR is then optionally calculated by an OSNR calculator 22 using the in-band noise $N(\lambda_p)$ and the discriminated signal $S(\lambda)$.

FIGS. 4A to 4D show different possible polarization optics arrangements 14 that can be used. In the example arrangement depicted in FIG. 4A, a polarization beam splitter 402 splits the input optical signal p into two orthogonal polarizations PA and $p_B$. The two samples $p_A$ and $p_B$ consequently correspond to different polarization analysis conditions. Acquisition of the two samples can then be made using a dual channel OSA or an optical switch can be used in front of a single channel OSA for alternating between the two polarization analysis conditions. It is also noted that the polarization splitter can be placed before or after the monochromator of the OSA.

Figure 4:
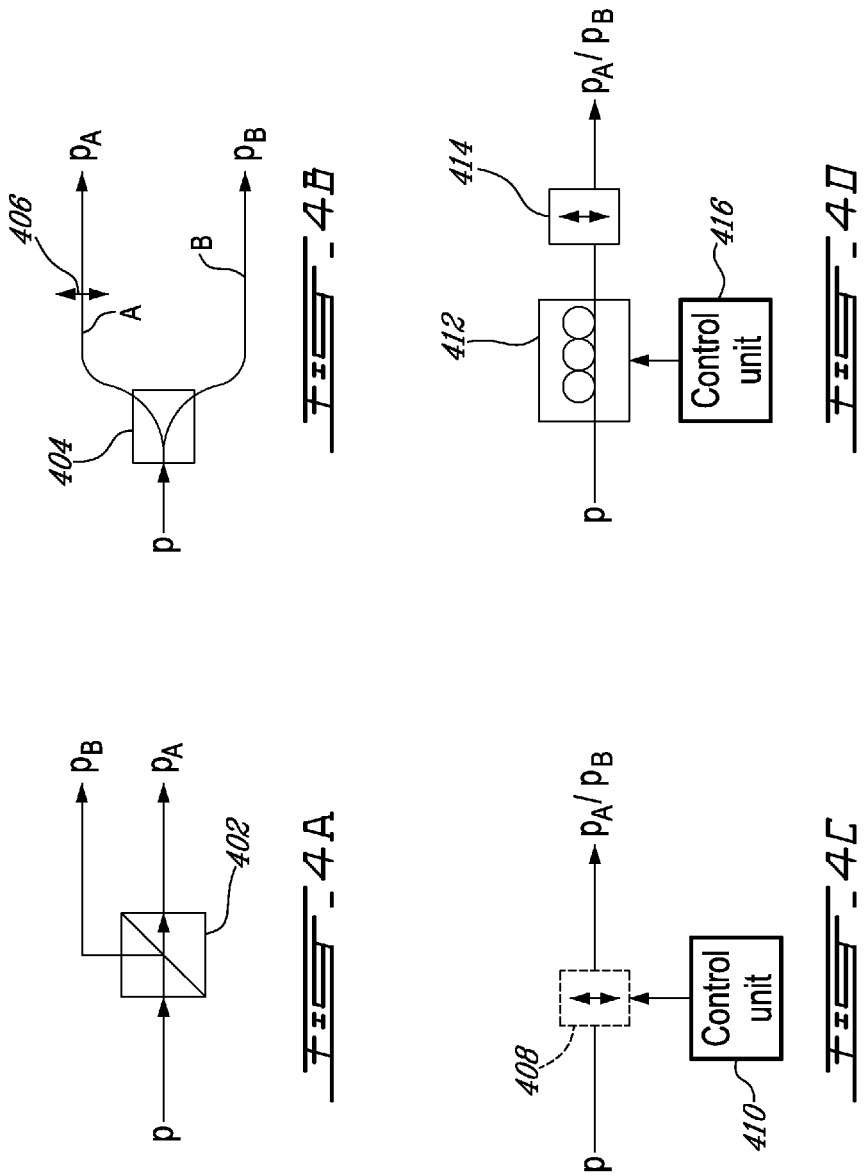
FIG. 4A is a block diagram showing a possible polarization optics arrangements to be used in the system of FIG. 3, wherein a polarization beam splitter is used.
FIG. 4B is a block diagram showing another possible polarization optics arrangements to be used in the system of FIG. 3, wherein a 50/50 optical coupler is used along with a polarizer.
FIG. 4C is a block diagram showing another possible polarization optics arrangements to be used in the system of FIG. 3, wherein a polarizer is alternately inserted and removed from the optical path.
FIG. 4D is a block diagram showing another possible polarization optics arrangements to be used in the system of FIG. 3, wherein a polarization controller is placed before a polarizer.

The example arrangement depicted FIG. 4B comprises a 50/50 optical coupler 404 that splits the input optical signal p onto two paths A and B. A polarizer 406 is inserted on path A to polarize the part of the input optical signal p propagating on path A in order to provide the first sample $p_A$, while the part of the input optical signal p propagating on path B is analyzed without applying a polarization.

The example arrangement depicted FIG. 4C comprises a polarizer 408 that is alternately inserted in the optical path of the input optical signal p to provide a first sample $p_A$, and removed from the path to provide the second sample $p_B$. The alternate insertion and removal of the polarizer 408 from the optical path is controlled by a control unit 410. In FIGS. 4B and 4C, the samples $p_A$ and $p_B$ correspond to different polarization analysis conditions.

The example arrangement depicted FIG. 4D comprises a polarization controller 412 placed before a polarizer 414. The polarization controller 412 is controlled by a control unit 416 which commands a variation of the polarization analysis conditions between the acquisition of sample $p_A$ and the acquisition of sample $p_B$.

It is also noted that although two paths are shown on FIG. 3 for $p_A$ and $p_B$ at the output of the polarization optics arrangement 14, when the arrangement of FIG. 4C or 4D is used $p_A$ and $p_B$ are actually provided successively on the same optical path.

In any of the polarization optics arrangement of FIGS. 4A, 4B, 4C and 4D, the first and second samples $p_A$ and $p_B$ of the input optical signal p are in different polarization analysis conditions from one another, and show different OSNRs. The alignment of the polarization optics arrangement to the input optical signal p is arbitrary and it is not required that the signal contribution be substantially suppressed on either one of the samples $p_A$ and $p_B$.

Figure 5:
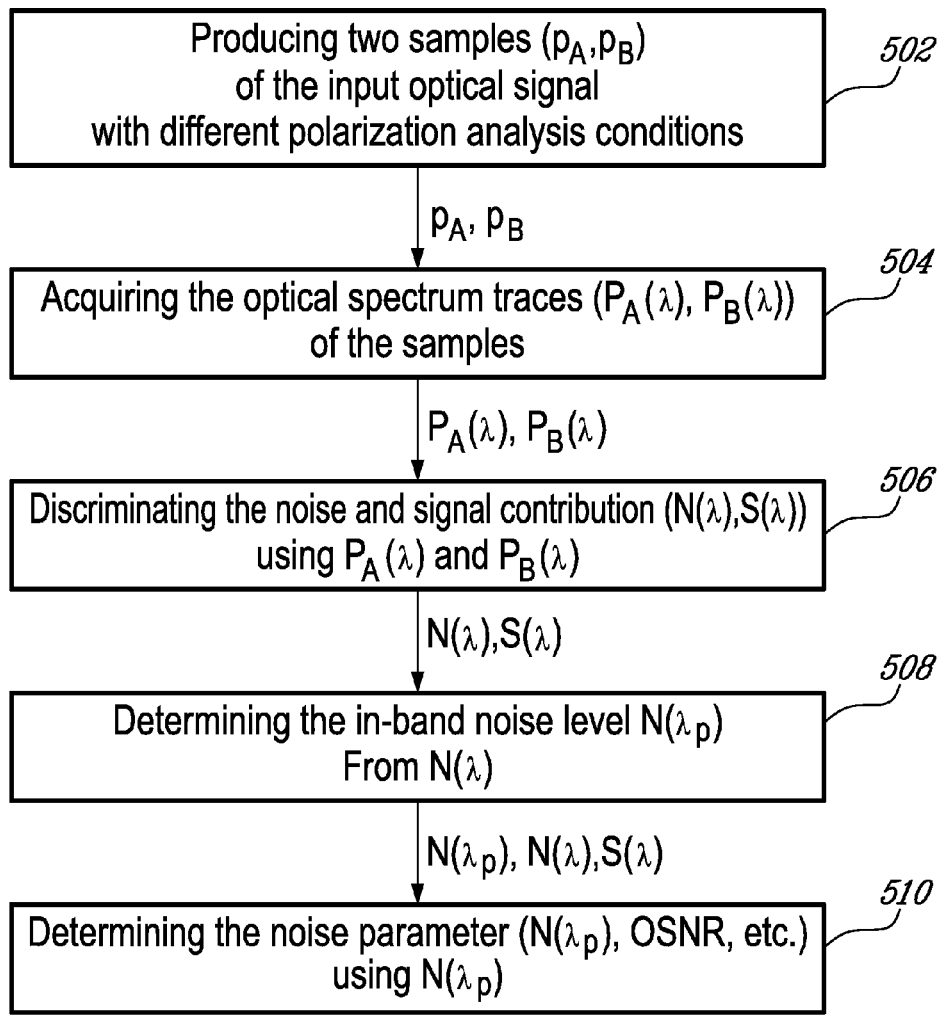
FIG. 5 is a flow chart illustrating a method for determining noise parameter on an input optical signal using a passive polarization-induced discrimination approach.

FIG. 5 illustrates a method for determining the in-band noise or the OSNR of the input optical signal p using the PPID approach. In step 502, the two samples $p_A$ and $p_B$ are produced from the input optical signal p using different polarization analysis conditions. The two polarization analysis conditions and thus the two samples $p_A$ and $p_B$ are typically produced by the polarization optics arrangement 14. In step 504, the optical spectrum traces $P_A(\lambda)$ and $P_B(\lambda)$, respectively, of the two samples $p_A$ and $p_B$ are acquired, typically using the OSA 11. In step 506, the noise N and signal S contributions are discriminated using the acquired traces $P_A(\lambda)$ and $P_B(\lambda)$, typically in the spectrum processor 18. One embodiment of this step is described in more detail below with reference to FIG. 7. In step 508, the in-band noise level $N(\lambda_p)$ is determined from N. This step is performed, for example, by the in-band noise calculator 20. In step 510, the noise parameter, i.e. the in-band noise or the OSNR, is determined using the in-band noise level $N(\lambda_p)$ and is typically output. The thereby determined noise parameter is output for use in monitoring, installation, commission, maintenance or troubleshooting of a DWDM optical system. For example, the noise parameter can be output using by graphical display, by printing, by generating an electrical signal or by storing it in memory for later retrieval. The in-band noise or OSNR can also be graphically or numerically output using a display unit or a printer, along with, for example, the individual and the sum of the acquired spectrum traces ($P_A(\lambda)$, $P_B(\lambda)$, $P(\lambda)$). Other parameters can also be displayed or otherwise output in a graphical or numerical form. The in-band noise level may also be output for optical signal processing or for determining the noise figure of an optical amplifier for example.

Figure 6:
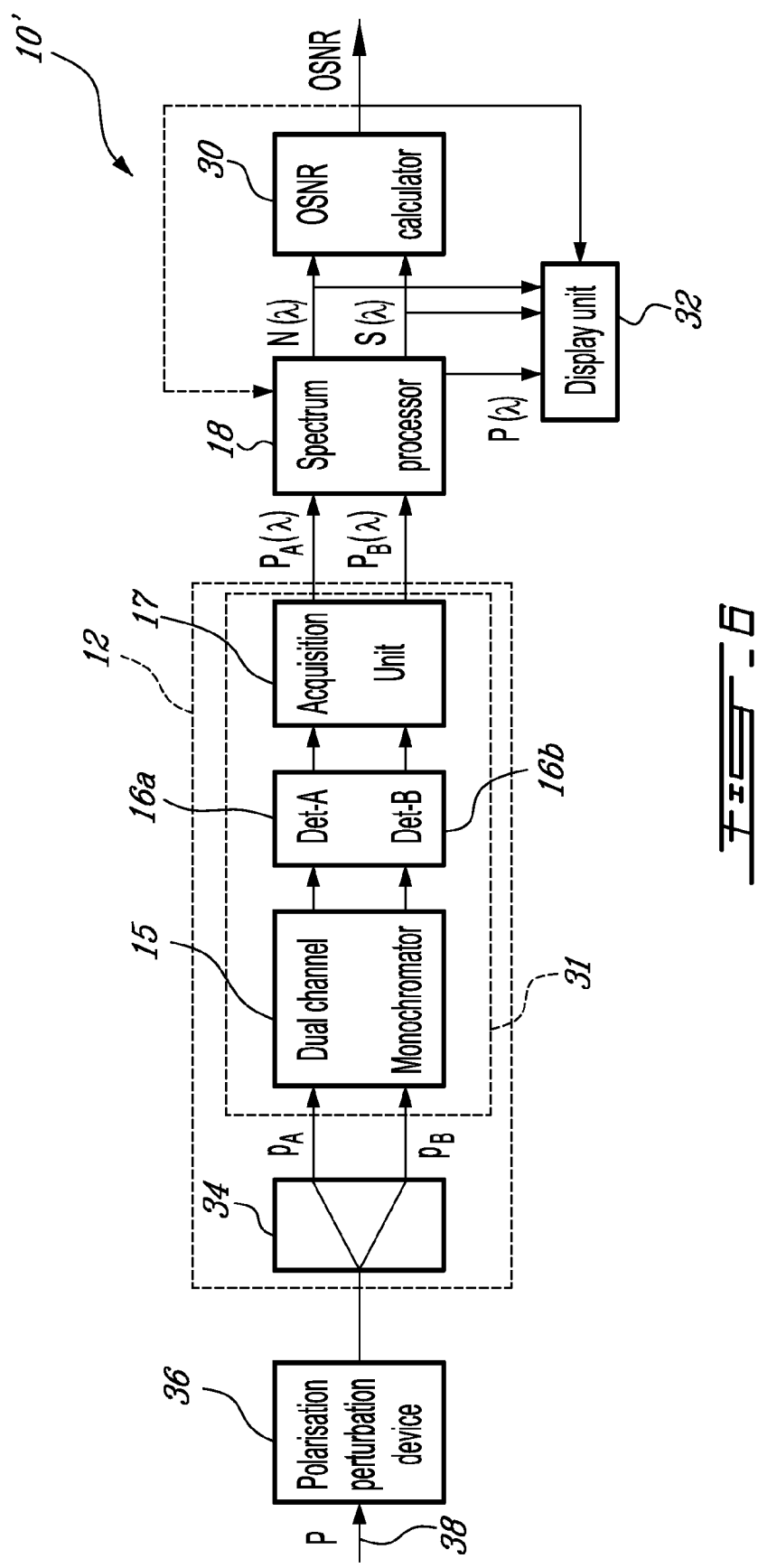
FIG. 6 is a block diagram of an embodiment of a system for determining a noise parameter on an input optical signal using a passive polarization-induced discrimination method, wherein a dual channel optical spectrum analyzer is used.

FIG. 6 shows one embodiment 10' of the system 10 generally described with reference to FIG. 3. The embodiment 10' uses a dual-channel polarization diverse OSA 12 (see, for example, the OSA described in U.S. Pat. No. 6,636,306) to implement the functions of both the polarization optics arrangement 14 and the OSA 11. An example of the PPID approach will be described in more detail below with reference to the system 10' of FIG. 6 and to FIG. 7. The polarization diverse OSA 12 receives the input optical signal p to be characterized on an input optical fiber 38. The polarization diverse OSA 12 comprises a polarization splitter 34 that splits the input optical signal p into two typically orthogonally polarized samples $p_A$ and $p_B$, and a dual channel OSA 31. The states of polarization are arbitrarily aligned with the input optical signal p such that each polarized samples $p_A$, $p_B$ typically has a non-zero signal contribution $s_A$, $s_B$ and a non-zero noise contribution $n_A$, $n_B$. The dual channel OSA 31 is used to simultaneously acquire the optical spectrum traces $P_A(\lambda)$, $P_B(\lambda)$ of two samples $p_A$, $p_B$. The dual channel OSA 31 comprises a dual channel grating-based monochromator 15 receiving both samples $p_A$, $p_B$ at inputs A and B and separating their wavelength components which are detected using an optical detector 16a, 16b respectively for each channel A, B. An acquisition unit 17 records the optical spectrum traces $P_A(\lambda)$ and $P_B(\lambda)$ of the two samples $p_A$, $p_B$. It will be understood that the acquisition is conditioned by the spectral response of the filter of the OSA and that the acquisition step typically comprises applying calibration factors, signal conditioning and processing to each detected trace.

The PPID approach requires that the OSNR of the two samples $p_A$, $p_B$ have a non-negligible difference. It may not be the case, for example, if the noise contribution n is substantially unpolarized while at the same time the signal contribution s is substantially polarized in a state of polarization oriented at 45° relative to the states of polarization of the polarization beam splitter 34. When this situation is detected, it can be circumvented by disturbing the input optical signal p to provide a small change in its polarization condition. This polarization disturbance can be provided manually by moving the input optical fiber 38. A polarization disturbance device 36, such as a polarization controller, can be also used to vary the polarization condition of the input optical signal p. The optical spectrum traces $P_A(\lambda)$, $P_B(\lambda)$ corresponding to the two samples $p_A$, $p_B$ are processed by a spectrum processor 18 which compares the acquired traces $P_A(\lambda)$, $P_B(\lambda)$ to discriminate the signal S contribution S and the noise contribution N in the acquired optical signals. The discriminated signal S and noise contribution N are used by an OSNR calculator 30 to determine the OSNR. A second iteration may be performed if required as will be explained below. The system 10' also has a display unit 32 for displaying the determined OSNR along with, for example, the individual and the sum of the acquired spectrum ($P_A(\lambda)$, $P_B(\lambda)$, $P(\lambda)$). Other parameters can also be displayed or otherwise output in a graphical or numerical form.

EXAMPLE 1

Figure 7:
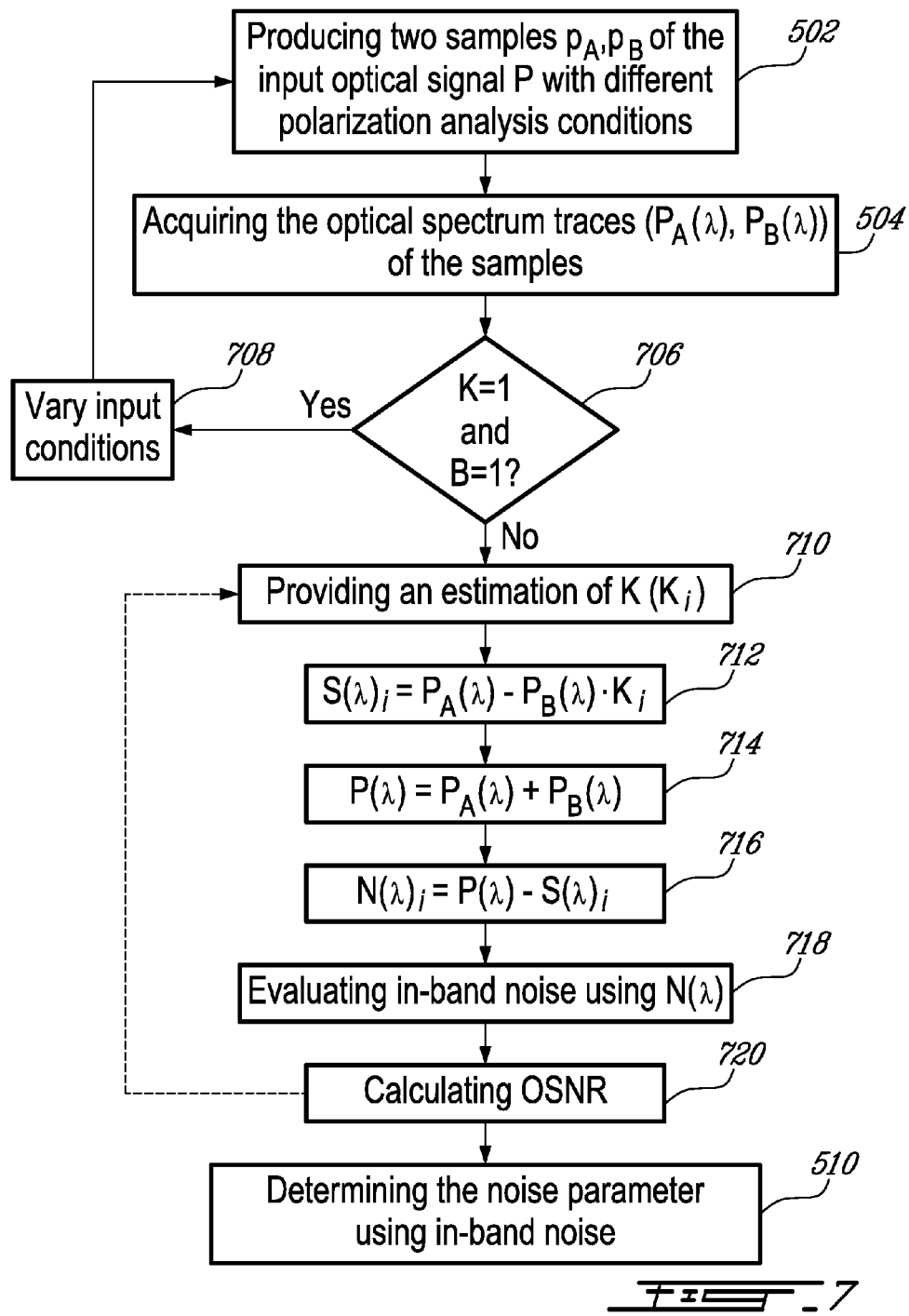
FIG. 7 is a flow chart illustrating an example embodiment of the method of FIG. 5, wherein the step of discriminating the signal and noise contributions is shown in more details.

One example embodiment of the processing performed by the spectrum processor 18 in order to discriminate the signal S and noise N contributions is now described with reference to FIG. 7.

In the following, the optical spectrum traces are analyzed and processed in the spectral neighborhood of each of the signal peaks, or DWDM optical channels, included in the input optical signal and for which a determination of the in-band noise level is desired. The signal peaks are identified by standard known implementation techniques such that their respective central wavelengths ($\lambda_p$) are determined. The in-band noise level and the OSNR on each signal peak can be estimated using the herein described method without requiring any further optical spectrum trace acquisition.

In step 502, two samples $p_A$ and $p_B$ are produced from the input optical signal p using different polarization analysis conditions as described above and typically using the polarization optics arrangement 34 of FIG. 6 in this case. In step 504, the optical spectrum traces $P_A(\lambda)$ and $P_B(\lambda)$ of the two samples $p_A$ and $p_B$ are acquired, typically using the dual-channel OSA 31 of FIG. 6.

Let the optical spectrum traces of the two samples $P_A(\lambda)$ and $P_B(\lambda)$ be respectively described as:

$$P_A(\lambda) = S_A(\lambda) + N_A(\lambda), \text{ and} \tag{3}$$

$$P_B(\lambda) = S_B(\lambda) + N_B(\lambda), \tag{4}$$

where $S_A$ and $S_B$ are the signal contributions to the two acquired optical spectrum traces within the optical channel and where $N_A$ and $N_B$ are the noise contributions to the two acquired optical spectrum traces within the optical bandwidth of interest. The global optical power spectrum $P(\lambda)$, which is representative of the optical signal p, is not necessarily acquired but can also be obtained by adding the acquired optical spectrum traces $P_A(\lambda)$, $P_B(\lambda)$:

$$P(\lambda)=P_A(\lambda)+P_B(\lambda), \qquad (5)$$

and the polarization diverse OSA 12 is calibrated such that $P(\lambda)$ corresponds to the optical spectrum of the input optical signal p as would be acquired by a non-diverse OSA if it was acquired before entering the system 10'.

According to the PPID approach, two optical spectrum traces $P_A(\lambda)$, $P_B(\lambda)$ are obtained using a polarization diverse OSA and are compared in order to discriminate the noise and signal contributions in the acquired traces $P_A(\lambda)$, $P_B(\lambda)$.

As in active polarization nulling methods, the signal contribution is assumed to be at least partially polarized and the noise contribution to be somewhat unpolarized. The PPID method then provides an evaluation of the noise and signal contributions. Within the optical bandwidth of interest:

$$N_B(\lambda)=\beta \cdot N_A(\lambda), \qquad (6)$$

$$S_B(\lambda)=k \cdot S_A(\lambda), \qquad (7)$$

where k is a constant which depends on the polarization alignment of the input optical signal p to polarization splitter 34 when the acquisition is performed, and where $\beta$ is a constant which is typically 1 in all cases if the noise contribution N is unpolarized.

The signal and noise contributions are also in different proportions on the two traces $P_A(\lambda)$, $P_B(\lambda)$, i.e. the OSNRs are different. It is noted, however, that the OSNRs are initially unknown and that the signal and noise contributions need to be discriminated before they are known.

The following describes a solution that is derived in the case where $N_A(\lambda)=N_B(\lambda)$ (or $\beta=1$), which is the case when the noise is unpolarized. It should however be noted that a special case arises when the polarization of the signal contribution s is substantially at 45° from the polarization splitter 34. In this special case, the difference between $S_A$ and $S_B$ is lower than the acquisition resolution of the OSA and k is equal to unity. In that specific case, the OSNR is equal on the two acquired optical spectrum traces $P_A(\lambda)$ and $P_B(\lambda)$, and the following method cannot be directly used. Accordingly, in step 706, in the special case where k=1 and $\beta=1$, a further acquisition with a varied input polarization condition (step 708) is performed. For example, in step 708, the input optical fiber 38 is manually moved, or the polarization disturbance device 36 is used. It is however noted that when k=1 and the noise is different on both traces, i.e. $N_A(\lambda) \neq N_B(\lambda)$ (as could be the case if the optical noise is not completely unpolarized), a PPID method can still be used without requiring the additional step of disturbing the input optical signal to change its polarization condition.

According to the assumptions described above, the contribution of the noise is canceled out in the subtraction of the two optical spectrum traces $P_A(\lambda)$, $P_B(\lambda)$ which yields:

$$P_A(\lambda)-P_B(\lambda)=S_A(\lambda)-S_B(\lambda)+(N_A(\lambda)-N_B(\lambda))=(1-k) \cdot S_A(\lambda) \qquad (8)$$

and $$P_A(\lambda)+P_B(\lambda)=S_A(\lambda)+S_B(\lambda)+N_A(\lambda)+N_B(\lambda)=(1+k) \cdot S_A(\lambda)+N(\lambda), \qquad (9)$$

where $N(\lambda)=N_A(\lambda)+N_B(\lambda)$, and $(N_A(\lambda)-N_B(\lambda))=0$.

From (8) and (9):

$$P_A(\lambda)+P_B(\lambda)=[(1+k)/(1-k)] \cdot (P_A(\lambda)-P_B(\lambda))+N(\lambda) \qquad (10)$$

$$S(\lambda)+N(\lambda)=K \cdot (P_A(\lambda)-P_B(\lambda))+N(\lambda), \qquad (11)$$

$$S(\lambda)=K \cdot (P_A(\lambda)-P_B(\lambda)), \text{ where } K=(1+k)/(1-k). \qquad (12)$$

K is not known a priori but can be first estimated, in step 710, by assuming that K is a constant which does not vary in wavelength and that the noise level is low:

$$k_i=P_A(\lambda_P)/P_B(\lambda_P), \qquad (13)$$

or letting:

$$K_i=[P_A(\lambda_p)+P_B(\lambda_p)]/[P_A(\lambda_p)-P_B(\lambda_p)]. \qquad (14)$$

This is based on the assumption that $K=S_A(\lambda_p)/S_B(\lambda_p)=S_A/S_B$ which is true provided that the channel bandwidth CBW over which the analysis is performed is larger than the optical signal bandwidth or provided that no polarization mode dispersion affects the signal, which would thus lead to $K(\lambda)=S_A(\lambda)/S_B(\lambda)$. In fact, $K_i$ is an over estimation that can be related to K as follows:

$$K_i=K \cdot (1+N(\lambda_p)/S(\lambda_p)). \qquad (15)$$

In step 712, from this estimation $K_i$, a first estimation of the optical spectrum of the signal contribution $S(\lambda)_i$ is obtained:

$$S(\lambda)_i=K_i \cdot (P_A(\lambda)-P_B(\lambda)) \qquad (16)$$

In step 714, an estimation of the global optical power spectrum of the input optical signal is also obtained, namely:

$$P(\lambda)=P_A(\lambda)+P_B(\lambda). \qquad (17)$$

In step 716, a first estimation of the noise contribution $N(\lambda)_i$ is obtained using:

$$N(\lambda)_i=P(\lambda)-S(\lambda)_i \qquad (18)$$

$$N(\lambda)_i=(P_A(\lambda)+P_B(\lambda))-K_i \cdot (P_A(\lambda)-P_B(\lambda)). \qquad (19)$$

Figure 8:
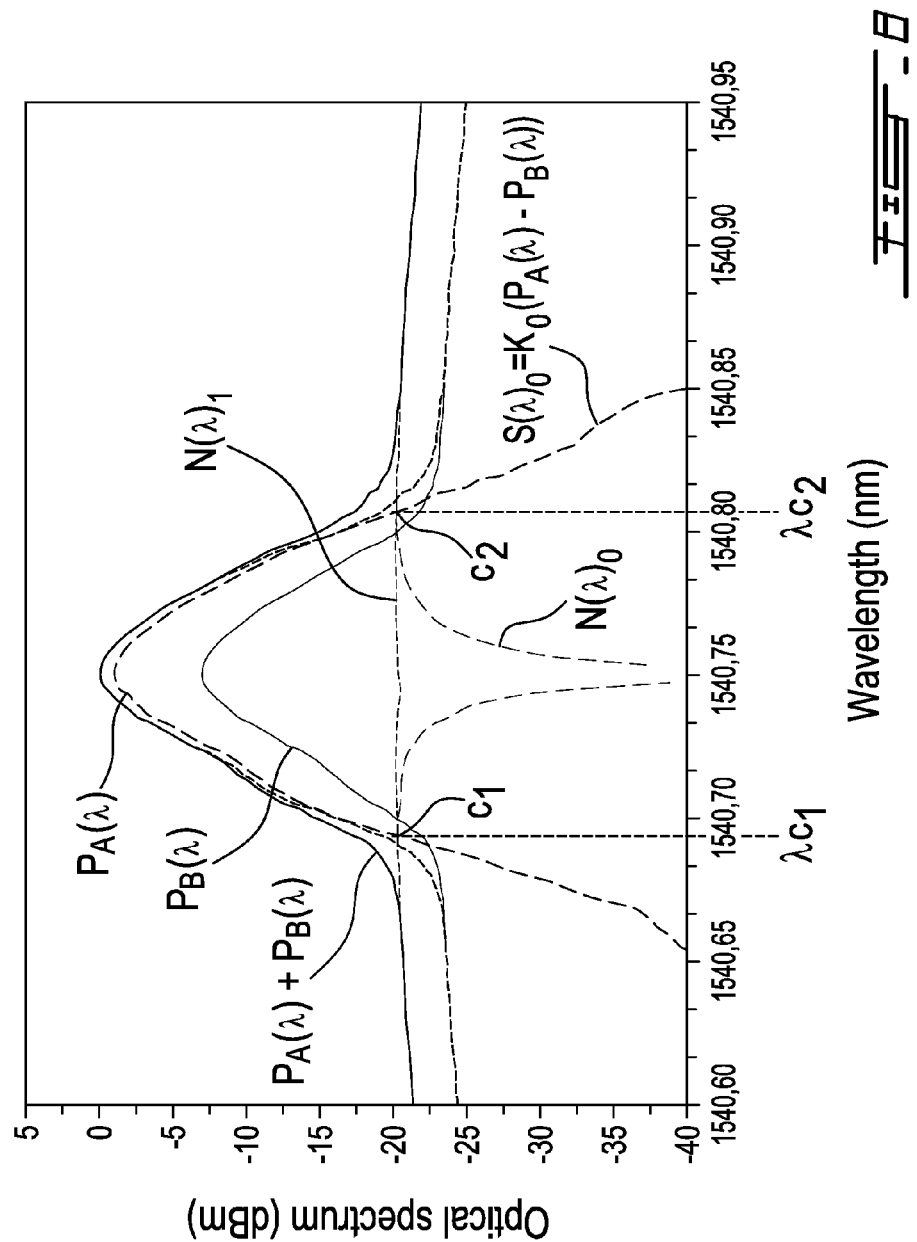
FIG. 8 is a graph illustrating the optical spectrum of an example input optical signal along with its discriminated noise and signal contributions, as calculated with a passive polarization-induced discrimination method.

An example of the global optical spectrum $P(\lambda)$ of an input optical signal p is shown in FIG. 8 as well as a first noise estimation $N(\lambda)_0$ and a further noise estimation $N(\lambda)_1$ after one iteration. The other curves in FIG. 8 represent the acquired traces $P_A(\lambda)$, $P_B(\lambda)$ and the estimation of the signal contribution $S(\lambda)_0$. It can be seen that the error introduced by $K_0$ on the first noise estimation $N(\lambda)_0$ is large at the exact position of the signal peak, but becomes minimal on the edges of the signal peak, i.e. where the edges of the signal estimation meet the noise estimation. These crossing points c1 and c2 where $S(\lambda)_0$ crosses $N(\lambda)_0$ can be used to provide a first estimation of the in-band noise. An interpolation at $\lambda_p$ of the estimated noise obtained at points c1 and c2, i.e. $N(\lambda_{c1})_0$ and $N(\lambda_{c2})_0$, provides an evaluation of the in-band noise $N(\lambda_p)_0$. At these crossing points, the error introduced by $K_0$ on the noise estimation is also $1+N(\lambda_p)/S(\lambda_p)$ which, for example, for a reasonable real life $S(\lambda_p)/N(\lambda_p)$ of 100 (20 dB), contributes for less than 0.05 dB.

Referring back to FIG. 7, in step 718, the in-band noise $N(\lambda_p)_0$ is first evaluated using the noise estimation $N(\lambda)_0$ at the edges of the signal peaks, i.e. at the crossing points c1, c2. In step 720, the $OSNR_0$ is calculated using the estimated in-band noise $N(\lambda_p)_0$ and the estimated signal $S(\lambda_p)_0$. This first estimation can be output at step 720 or iterations can be performed. Using the first estimation of the $OSNR_0$, a second estimation of K, i.e. $K_1$, is provided in step 710 from (15):

$$K_1=[P_A(\lambda_p)+P_B(\lambda_p)]/[P_A(\lambda_p)-P_B(\lambda_p)] \cdot 1/(1+1/OSNR_0). \qquad (20)$$

In step 510, the noise parameter, i.e. the in-band noise, the OSNR or any other noise parameter, is determined using the determined in-band noise level $N(\lambda_p)$ and is typically output.

Steps 712, 714, 716, 718, 720 and 510 are then repeated using a better estimation of K.

One skilled in the art will appreciate that the method used in step 718 to estimate the in-band noise can be varied. Referring to FIG. 8, in Example 1, the in-band noise is evaluated using an interpolation of the values of the estimated noise on points c1 and c2, i.e. $N(\lambda_{c1})$, and $N(\lambda_{c2})$. In another embodiment, all points located in wavelengths in the neighborhood of c1 and c2 can be used in the interpolation.

In steps 712, 714 and 716 of Example 1, the signal contribution $S(\lambda)$ is first isolated and the noise contribution $N(\lambda)$ is then discriminated by subtracting the signal contribution $S(\lambda)$ from the global optical spectrum $P(\lambda)$. It is however noted that the calculations can be varied. For example, the noise contribution $N(\lambda)$ can be isolated first and the signal contribution $S(\lambda)$ discriminated by subtracting the noise contribution $N(\lambda)$ from the global optical spectrum $P(\lambda)$. For example, by assuming $N_A(\lambda) = N_B(\lambda)$ in step 712, equation (16) can be replaced by:

$$N(\lambda) = 2/(k_i - 1) \cdot [k_i \cdot P_A(\lambda) - P_B(\lambda)]. \quad (21)$$

It should further be appreciated that steps 712, 714 and 716 can be modified to show little sensitivity to unequal noise levels of the two acquired traces, i.e. when $N_A(\lambda) \neq N_B(\lambda)$. In the case of unequal noise, equations (8) and (9) can be rewritten in a more general form by letting:

$$N_B(\lambda) = \beta \cdot N_A(\lambda), \text{ that is} \quad (22)$$

$$P_A(\lambda) - P_B(\lambda) = S_A(\lambda) - S_B(\lambda) + N_A(\lambda) - N_B(\lambda) = (1-k) S_A(\lambda) + (1-\beta) N_A(\lambda), \text{ and} \quad (23)$$

$$P_A(\lambda) + P_B(\lambda) = S_A(\lambda) + S_B(\lambda) + N_A(\lambda) + N_B(\lambda) = (1+k) S_A(\lambda) + (1+\beta) N_A(\lambda). \quad (24)$$

In order to minimize the error introduced by the difference in noise level on $P_A(\lambda)$ and $P_B(\lambda)$, a multiplication factor y can be chosen (for example by analysis of the subtraction to avoid discontinuities that can arise when negative values are obtained) and applied to $P_B(\lambda)$ such that $(1 - \gamma \cdot \beta)$ is minimized to substantially 0. The difference thus obtained is proportional to the signal and we are back in a situation similar to the previously described condition where the noise was substantially unpolarized.

The OSNR of each signal channel of a DWDM system is obtained by independently performing the same calculations for each signal peak, using the acquired optical spectrum traces $P_A(\lambda)$ and $P_B(\lambda)$. No further acquisition is required.

As described above, the PPID approach reaches a limit in the special case where k is equal to unity, or more generally when k and β are equal within the acquisition resolution, therefore leading to identical signal-to-noise ratios in the two conditions. In this case, a further acquisition with a varied input polarization alignment of the input optical signal can be performed to circumvent this undesired condition. The input polarization alignment can be slightly changed by various simple means. For example, the input optical fiber 38 can be slightly moved, or a supplemental piece of hardware, such as the polarization controller 36, can be introduced in the system to change the polarization alignment of the input optical signal p with respect to the polarization analysis conditions in such cases.

In one embodiment, a digitally controlled polarization controller 36 is used in a system such as the one shown in FIG. 6. For each in-band noise determination to be performed, a first pair of optical spectrum traces $P_A(\lambda)$, $P_B(\lambda)$ is acquired. The polarization controller 36 is then used to automatically vary the input conditions, i.e. the polarization of the input optical signal, and a second pair of optical spectrum traces $P_C(\lambda)$, $P_D(\lambda)$ is then acquired. The spectrum processor 18 then selects which pair of traces to use, or which two traces among the four to use, for the noise and signal discrimination. The limit case where k and β are equal can then be avoided. The selection is made, for example, by selecting the two traces showing the largest difference in signal peak level from one another. Of course, more than two pairs of traces may be acquired or multiple analyses can be performed to improve the accuracy of the method.

In another embodiment, a single channel OSA is used along with the setup of FIG. 4D and multiple acquisitions (more than two) at different polarizer conditions are performed. The spectrum processor 18 then selects which traces to use for the noise and signal discrimination.

Another possibility is to use an alternative algorithm when the approach reaches the limit case where k and β are equal. An example of this is a hybrid approach as described further below in the section entitled "Hybrid Approaches".

Differential Resolution Bandwidth Discrimination Approach (DRBD)

As discussed hereinabove, a further method of discriminating the optical noise contribution from the optical signal contribution in the input optical signal is to rely on the differences in their spectral properties, namely that the noise contribution $n(\lambda)$ varies more slowly in wavelength than the signal contribution $s(\lambda)$. The Differential Resolution Bandwidth Discrimination (DRBD) approach uses these differential spectral properties between the signal contribution $s(\lambda)$ and the noise contribution $n(\lambda)$ in the input optical signal to be analyzed.

Figure 9:
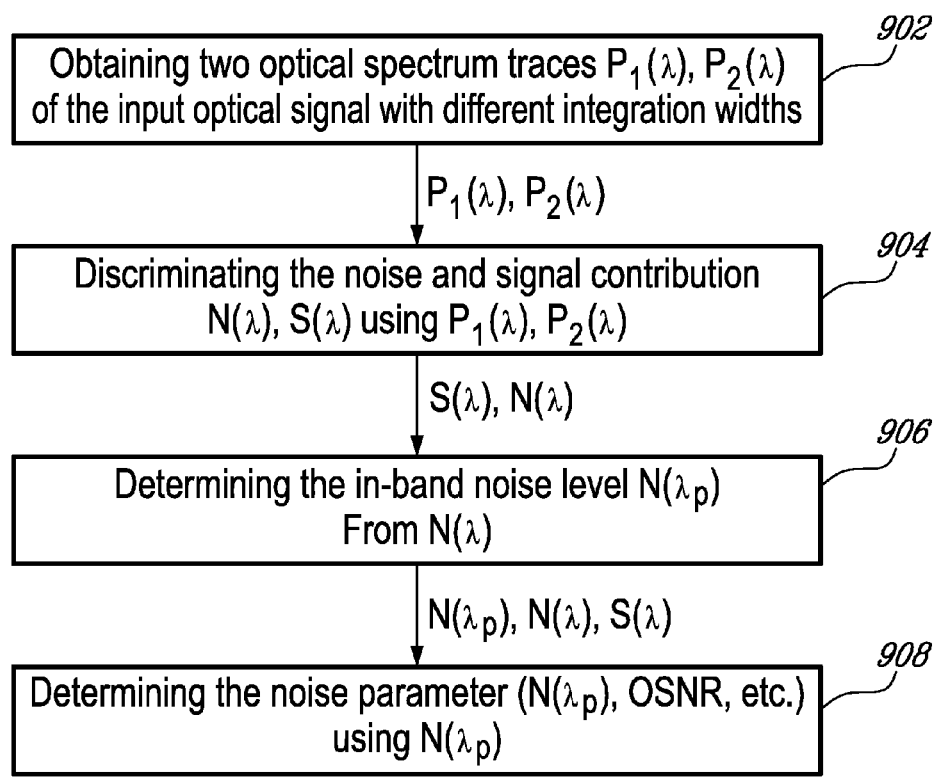
FIG. 9 is a flow chart illustrating a method for determining noise parameter on an input optical signal using a differential resolution bandwidth discrimination approach.

FIG. 9 illustrates a method for determining the in-band noise, the OSNR or any other noise parameter to be determined on the input optical signal p using the DRBD approach in general. In step 902, at least two optical spectrum traces $P_1(\lambda)$, $P_2(\lambda)$ of the input optical signal p are obtained using different integration widths. In order to obtain the two traces, the RBW slit of the OSA can be used to adjust the RBW to two different values. The two traces are then directly acquired using the OSA. The two traces may also be obtained by numerical integration using sliding windows with different widths, which is the mathematical equivalent to varying the RBW slit of the OSA. In other words, $$P_1(\lambda) = h_1(\lambda) * h_{OSA1}(\lambda) * p(\lambda) = H_1(\lambda) * p(\lambda), \quad (25)$$

$$P_2(\lambda) = h_2(\lambda) * h_{OSA2}(\lambda) * p(\lambda) = H_2(\lambda) * p(\lambda), \quad (26)$$

where $h_i(\lambda)$, i=1 or 2, represents the numerical integration function and $h_{OSAi}(\lambda)$ represents the OSA integration width caused by hardware, i.e. the RBW slit of the OSA. Either $h_i(\lambda)$ or $h_{OSAi}(\lambda)$ can be varied to obtain optical spectrum traces $P_1(\lambda)$, $P_2(\lambda)$ with different integration widths. The convolution window $H_i(\lambda)$, resultant from the numerical integration function $h_i(\lambda)$ combined with the OSA integration width $h_{OSAi}(\lambda)$, is typically selected such that $H_2(\lambda)$ is larger than $H_1(\lambda)$ and $H_2(\lambda)$ is narrower than the region where the noise contribution to be determined is present. $H_2(\lambda)$ is thus typically narrower than the channel bandwidth. The resulting traces $P_1(\lambda)$ and $P_2(\lambda)$ have different levels of noise and signal contributions and, consequently, different signal-to-noise ratios:

$$P_1(\lambda) = S_1(\lambda) + N_1(\lambda) = H_1(\lambda) * s(\lambda) + H_1(\lambda) * n(\lambda) = h_1(\lambda) * S(\lambda) + h_1(\lambda) * N(\lambda), \quad (27)$$

$$P_2(\lambda) = S_2(\lambda) + N_2(\lambda) = H_2(\lambda) * s(\lambda) + H_2(\lambda) * n(\lambda) = h_2(\lambda) * S(\lambda) + h_2(\lambda) * N(\lambda). \quad (28)$$

As will be discussed in more details below, some assumptions or knowledge on the signal and noise contributions allows for their discrimination.

In step 904, the noise N and signal S contributions are mathematically discriminated using the optical spectrum traces $P_1(\lambda)$ and $P_2(\lambda)$. Embodiments of this step are described in more detail below with reference to FIGS. 10 to 12. In step 906, the in-band noise level $N(\lambda_p)$ is determined from N. In step 908, the noise parameter, i.e. the in-band noise, the OSNR or any other noise parameter, is determined using the determined in-band noise level $N(\lambda_p)$ and is typically output.

EXAMPLE 2

One example embodiment of a method according to the DRBD approach is now described with reference FIGS. 10 and 11.

In this example, the numerical integration functions $h_1(\lambda)$ and $h_2(\lambda)$ are rectangular convolution windows of width $RBW_1$ and $RBW_2$ respectively. In step 1002, the two optical spectrum traces $P_1(\lambda)$ and $P_2(\lambda)$ are obtained by first acquiring an input optical spectrum trace:

$$P(\lambda)=h_{OSA}(\lambda)*p(\lambda)=S(\lambda)+N(\lambda), \tag{29}$$

that is then integrated with the convolution windows $h_1(\lambda)$ and $h_2(\lambda)$ to obtain $P_1(\lambda)$ and $P_2(\lambda)$ respectively (see equations (25) and (26) where $h_{OSA}(\lambda)=h_{OSA1}(\lambda)=h_{OSA2}(\lambda)$ in this case). The two optical spectrum traces $P_1(\lambda)$ and $P_2(\lambda)$ are obtained with $h_1(\lambda)$ being chosen such that the resulting signal peak in $S_1(\lambda)$ is flat, as shown in FIG. 11, or the signal peak in $S_1(\lambda)$ exhibits a constant slope, i.e. in the case of a non-flat noise, in the immediate region of the peak, i.e. over $\lambda_p \pm \delta\lambda$, where $\delta\lambda$ is greater than the acquisition resolution. In other words:

$$S_1(\lambda_p)=S_2(\lambda_p), \text{ or}$$

$$h_1(\lambda)*S(\lambda)|\lambda_p=h_2(\lambda)*S(\lambda)|\lambda_p, \tag{30}$$

where $|\lambda_p$ denotes an evaluation of the preceding expression at $\lambda_p$.

In this example, $RBW_2$ is larger than $RBW_1$ and is chosen as the optical channel bandwidth, or the defined multiplexer bandwidth for a given network configuration, the multiplexer bandwidth typically corresponding to the bandwidth to which the noise is limited. It is noted that the precision of the in-noise level to be obtained is a function of the power level resolution of the acquired optical spectrum traces and of the number of data points in the bandwidth defined by $RBW_2-RBW_1$.

Figure 11:
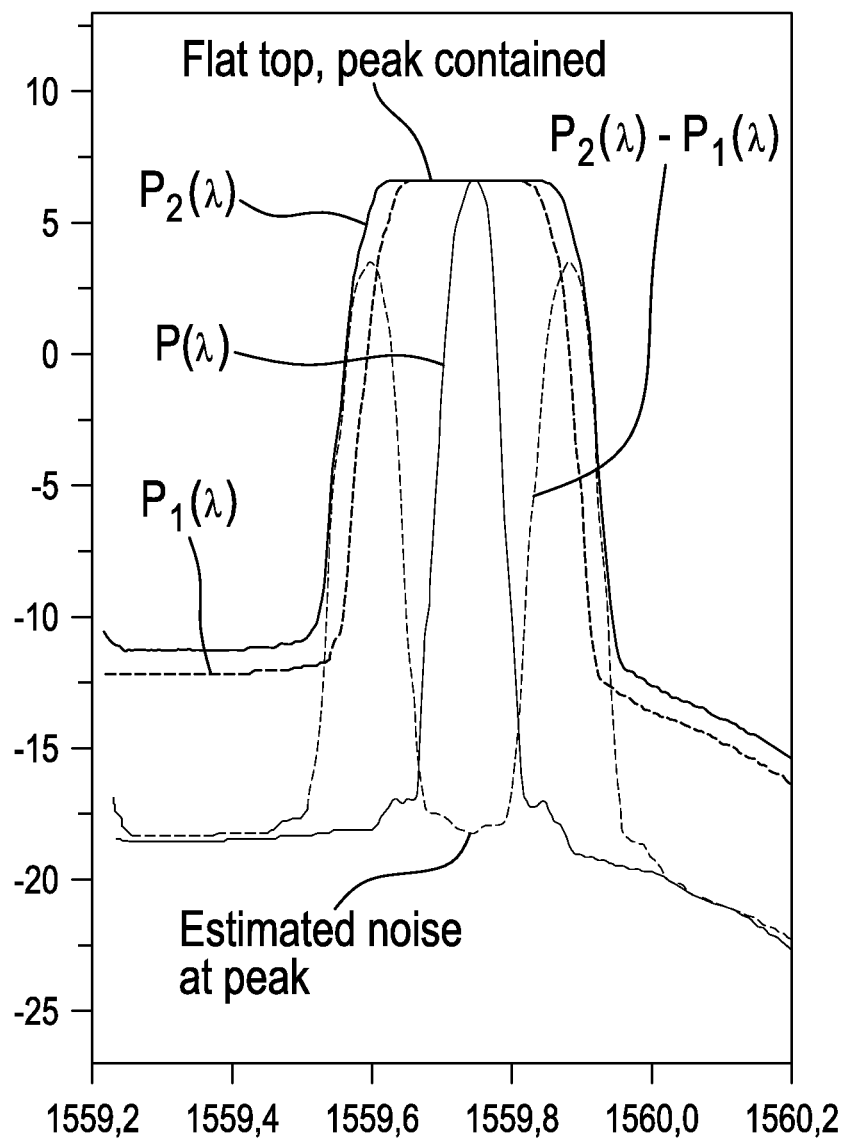
FIG. 11 is a graph illustrating the optical spectrum of an example input optical signal to which the method of FIG. 10 is applied.

As can be seen on FIG. 11, when both $RBW_1$ and $RBW_2$ are selected larger than the width of the signal peak (the optical signal bandwidth), as the width of the convolution window is enlarged from $RBW_1$ to $RBW_2$ centered on the signal peak, the peak level (i.e. at $\lambda_p$) of the signal contribution does not substantially vary from $S_1(\lambda)$ to $S_2(\lambda)$ in the integrated optical spectrum traces $P_1(\lambda)$ and $P_2(\lambda)$. The variation of power level from $P_1(\lambda_p)$ to $P_2(\lambda_p)$ comes from the noise contribution which is integrated over a larger convolution window in $P_2(\lambda)$ than in $P_1(\lambda)$. This variation of the power level at $\lambda_p$ can then be used to evaluate the noise contribution at $\lambda_p$, i.e. $N(\lambda_p)$, with the assumption that the noise in the wavelength range between $RBW_1$ and $RBW_2$ is representative of the noise at $\lambda_p$ and then applying the desired normalizing factor to account for the chosen integration widths and OSA filter spectral response. Accordingly, in step 1004, the in-band noise is estimated by subtracting the two optical spectrum traces evaluated at $\lambda_p$:

$$P_2(\lambda_p)-P_1(\lambda_p)=[h_2(\lambda)-h_1(\lambda)]*N(\lambda)|\lambda_p, \tag{31}$$

the in-band noise corresponding to the noise level at the peak central wavelength $\lambda_p$.

In step 1006, equation (31) is solved to find the in-band noise at $\lambda_p$ ($N(\lambda_p)$) using known mathematical techniques.

In step 1008, the noise parameter, i.e. the in-band noise, the OSNR or any other noise parameter, is determined using the determined in-band noise level $N(\lambda_p)$ and is typically output.

This method provides for an adaptive noise estimation technique where $h_2(\lambda)$ and $h_1(\lambda)$ are optimally selected according to the input optical signal without requiring an experimented user's judgment.

One will understand that the shape of the convolution windows $h_1(\lambda)$ and $h_2(\lambda)$ can be varied. Gaussian shape windows, for example, can be used.

Figure 10:
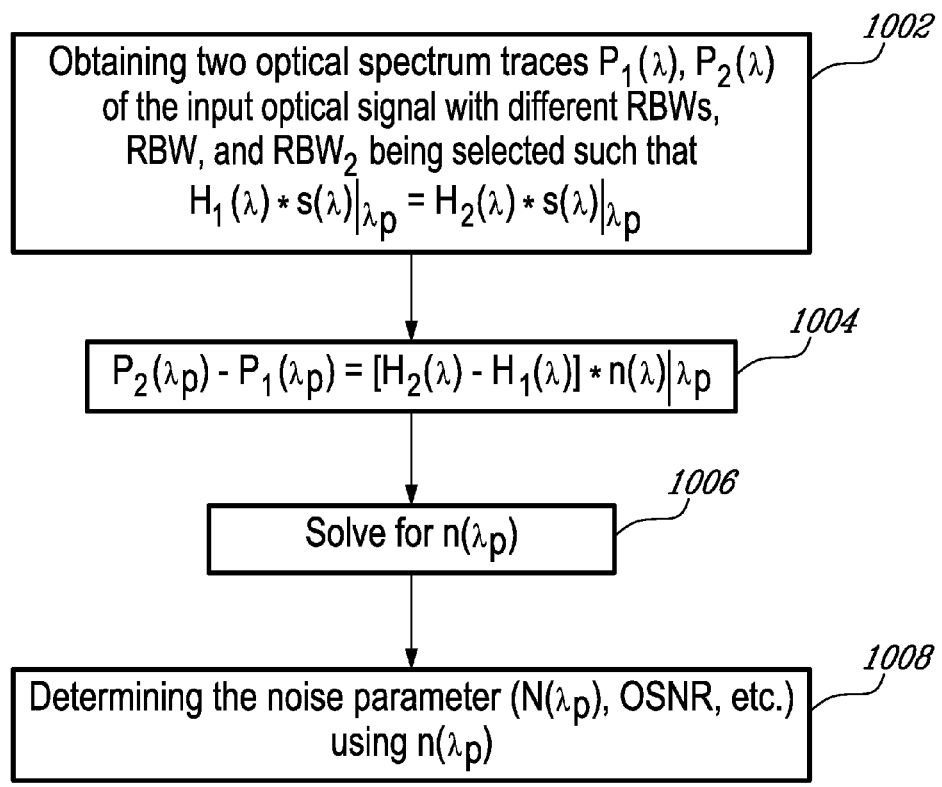
FIG. 10 is a flow chart illustrating an example embodiment of the method of FIG. 9 with chosen integrating windows to achieve a flat-top signal peak on two optical spectrum traces.
Figure 12:
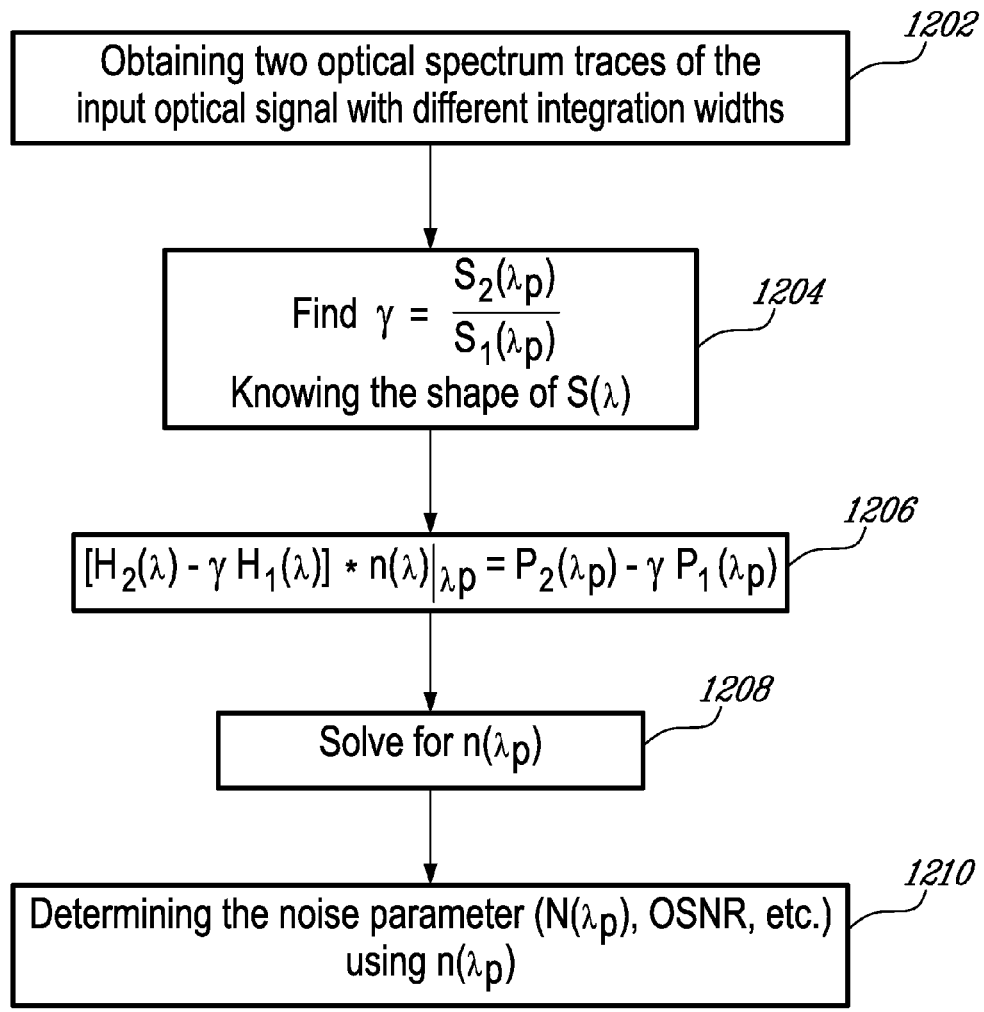
FIG. 12 is a flow chart illustrating another example embodiment of the method of FIG. 9 assuming a known shape of the signal contribution.

The method of FIG. 10 shows some limitations when the signal is spectrally large and the noise is substantially limited to the optical signal bandwidth, forcing the choice of an inappropriate $RBW_1$ and $RBW_2$ pair and leading to estimation errors in the noise. This, however, can be remedied when properties of the shapes of the signal contribution $s(\lambda)$ or of the noise contribution $n(\lambda)$ are known. FIG. 12 illustrates such a method allowing the determination of an in-band noise parameter when shape properties of the signal contribution $s(\lambda)$ are known.

EXAMPLE 3

When the signal peak is nearly as wide as the width of the noise contribution in the optical channel, the assumption made in the method of FIG. 10 that the signal peak power integrated over a wider bandwidth $RBW_2$ is equal to the signal peak power when integrated over $RBW_1$ becomes unsuitable. However, when the spectral shape of the signal contribution is known, it is no longer necessary to choose a first convolution window $h_1(\lambda)$ that entirely contains all of the signal power. For example, the spectral shape of the signal contribution $s(\lambda)$ can be found by recognizing the modulation spectrum of the signal, or relying on the polarization properties as described above, which would be an example of a hybrid approach as described below. The spectral shape of the signal contribution $s(\lambda)$ can also be found by applying filtering techniques assuming that the noise contribution $n(\lambda)$ spectrally varies slowly compared to the signal contribution $s(\lambda)$ over the optical signal bandwidth. Spectrally faster components are then identified on the acquired optical spectrum trace and the signal contribution $s(\lambda)$ is assumed to correspond to those.

Now referring to FIG. 12, in step 1204, the shape of the signal contribution $s(\lambda)$ can be either previously known or can be found using various techniques. Assuming that the shape of the signal contribution $s(\lambda)$ is known, the relation factor $\gamma$ between $s_2(\lambda_p)$ and $s_1(\lambda_p)$ is also known. Let $$\gamma=s_2(\lambda_p)/s_1(\lambda_p) \tag{32}$$

from equations (27) and (28), $$P_2(\lambda_p)-\gamma P_1(\lambda_p)=N_2(\lambda)-\gamma N_1(\lambda)|\lambda_p \tag{33}$$

$$P_2(\lambda_p)-\gamma P_1(\lambda_p)=H_2(\lambda)*n(\lambda)-\gamma H_1(\lambda)*n(\lambda)|\lambda_p \tag{34}$$

$$P_2(\lambda_p)-\gamma P_1(\lambda_p)=[H_2(\lambda)-\gamma H1(\lambda)]*n(\lambda)|\lambda_p. \tag{35}$$

In step 1208, since $H_2(\lambda)$, $H_1(\lambda)$ and $\gamma$ are known, the noise contribution $n(\lambda)$ at $\lambda_p$ can be solved for in equation (35) using known mathematical techniques. For example, if again rectangular convolution windows are chosen, step 1208 is equivalent to determining the noise within a region corresponding to $H_2(\lambda_p)-H_1(\lambda_p)$, and assuming that this noise is representative of the noise contribution $n(\lambda)$ at $\lambda_p$. The in-band noise $n(\lambda_p)$ can be obtained.

In step 1210, the noise parameter, i.e. the in-band noise, the OSNR or any other noise parameter, is determined using the determined in-band noise level and is typically output.

It is noted that when determining, in step 1204, the shape of the signal contribution $s(\lambda)$ using filtering techniques, it can be difficult to properly discriminate the noise contribution $n(\lambda)$ from the signal contribution $s(\lambda)$ when the signal contribution has a slowly varying spectral component that would be filtered when filtering the slowly varying noise contribution $n(\lambda)$. However, proper selection of filters and evaluation in specific regions of the spectrum, for example on fast rising or falling edges, may allow determination of the shape of the signal contribution with sufficient precision to identify how the signal contribution should vary when applying different convolution windows.

It is noted that one skilled in the art will recognize that changes may be made to the DRBD approach described herein. For example, instead of performing numerical convolutions to provide two optical spectrum traces of the input optical signal, the RBW of the OSA can be varied using its variable RBW slit such that the optical spectrum traces acquired with these new parameters provide the two integration traces. It should still be noted that numerical convolutions are less sensitive to the calibration of the OSA.

Hybrid Approaches

The PPID approach and the DRBD approach each have some different advantages and drawbacks and can be combined in a hybrid approach which circumvents the limits of each approach. A proper combination of both approaches can be chosen for adapting the method to cases where the acquisition conditions limit the performance of one or the other.

For example, as described above, the PPID approach is limited when the signal-to-noise ratio is the same on the two acquired traces, e.g. when the signal level is the same on $P_A(\lambda)$ and $P_B(\lambda)$, and $N_A(\lambda)=N_B(\lambda)$ (i.e. the input optical signal has a polarization state that is aligned at 45° with the polarization beam splitter 34 in the example of FIG. 6). The PPID approach can then be replaced by the DRBD approach.

Furthermore, it should be noted that the DRBD approach is particularly effective in cases where the OSNR is small (i.e. when the signal peak is significantly suppressed). One can benefit from this advantage to improve the PPID approach in cases where, on one of the acquired trace ($P_A(\lambda)$ or $P_B(\lambda)$), the signal peak is substantially suppressed. This can be useful when, for example, the shape of the signal contribution contains artifacts introducing errors in the subtraction process. Applying the DRBD to such a trace provides a more accurate estimation of the noise level in that polarization analysis condition. The DRBD approach may also be used in an active polarization nulling method (see J. H. Lee et al., "OSNR Monitoring Technique Using Polarization-Nulling Method", IEEE Photonics Technology Letters, Vol. 13, No. 1, January 2001) to reduce the requirements on the suppression of the signal. A measurement having a residual signal contribution may then be used to estimate the noise.

There are multiple ways to combine the two approaches in the manner that is most suitable for the condition of acquisition that is available. For example, it is noted that the PPID approach is dependent on the degree of polarization (DOP) of the noise and signal contributions. When the polarization mode dispersion or the polarization dependent loss of the system reaches a point where the PPID approach becomes inaccurate, the DRBD approach can be used as an alternative.

EXAMPLE 4

One hybrid approach that combines both the PPID and DRBD approaches in order to improve their performances is now described with reference to FIG. 13.

In step 1302, two samples $p_A$ and $p_B$ are produced from the input optical signal p using different polarization analysis conditions as described above according to the PPID approach. The two samples $p_A$ and $p_B$ are typically obtained using a polarization optics arrangement such as the polarization beam splitter 34 of FIG. 6.

In step 1304, the optical spectrum traces $P_A(\lambda)$ and $P_B(\lambda)$ of the two samples $p_A$ and $p_B$ are acquired, typically using the dual-channel OSA 31 of FIG. 6. As mentioned previously:

$$P_A(\lambda)=S_A(\lambda)+N_A(\lambda), \text{ and} \qquad (36)$$

$$P_B(\lambda)=S_B(\lambda)+N_B(\lambda). \qquad (37)$$

In step 1306, two different integration widths, $RBW_1$ and $RBW_2$ ($RBW_2$ larger than $RBW_1$), are selected such that the signal power is substantially contained within $RBW_1$, and $RBW_2$ is still narrower than the spectral width of the noise contribution. The acquired traces $P_A(\lambda)$ and $P_B(\lambda)$ are then numerically integrated by performing a convolution respectively with a rectangular window $h_1(\lambda)$ and $h_2(\lambda)$ of width $RBW_1$ and $RBW_2$ respectively. This yields the following results:

$$P_{A1}(\lambda)=P_A(\lambda)*h_1(\lambda)=S_{A1}(\lambda)+N_{A1}(\lambda), \qquad (38)$$

$$P_{B1}(\lambda)=P_B(\lambda)*h_1(\lambda)=S_{B1}(\lambda)+N_{B1}(\lambda), \qquad (39)$$

$$P_{A2}(\lambda)=P_A(\lambda)*h_2(\lambda)=S_{A2}(\lambda)+N_{A2}(\lambda), \qquad (40)$$

$$P_{B2}(\lambda)=P_B(\lambda)*h_2(\lambda)=S_{B2}(\lambda)+N_{B2}(\lambda). \qquad (41)$$

In step 1308, the noise and signal contributions are discriminated by applying PPID method on the optical spectrum traces $P_{A1}(\lambda)$, $P_{B1}(\lambda)$, $P_{A2}(\lambda)$ and $P_{B2}(\lambda)$. Let:

$$K_1=[P_{A1}(\lambda_p)+P_{B1}(\lambda_p)]/[P_{A1}(\lambda_p)-P_{B1}(\lambda_p)], \qquad (42)$$

we have:

$$[P_{A2}(\lambda_p)+P_{B2}(\lambda_p)]-K_1[P_{A2}(\lambda_p)-P_{B2}(\lambda_p)]=[S_{A2}(\lambda)+N_{A2}(\lambda)+S_{B2}(\lambda)+N_{B2}(\lambda)]-K_1 \cdot [S_{A2}(\lambda)+N_{A2}(\lambda)-S_{B2}(\lambda)-N_{B2}(\lambda)] \qquad (43)$$

Then, inserting $K_1$ from equation (42) into (43), noting that $S_{B1}(\lambda)=S_{B2}(\lambda)$ and $S_{A1}(\lambda)=S_{A2}(\lambda)$ as a consequence of the choice of $RBW_1$ and $RBW_2$ in step 1306 above, and assuming that $N_{A1}(\lambda)=N_{B1}(\lambda)$ and $N_{A2}(\lambda)=N_{B2}(\lambda)$, which is the case when the noise contribution is essentially depolarized, then $$[P_{A2}(\lambda_p)+P_{B2}(\lambda_p)]-K_1 \cdot [P_{A2}(\lambda_p)-P_{B2}(\lambda_p)]=N_{A2}(\lambda)+N_{B2}(\lambda)- \qquad (44)$$
$$[N_{A1}(\lambda)+N_{B1}(\lambda)]$$
$$=N(\Delta RBW)$$

where $N(\Delta RBW)$ is the noise contribution integrated in the spectral region corresponding to $RBW_2-RBW_1$. $N(\Delta RBW)$ therefore corresponds to the noise that would be measured by an OSA having a resolution bandwidth equal to the difference of integration widths, i.e. $RBW_2-RBW_1$.

Other integration widths $RBW_1$ and $RBW_2$ can then be used by going back to step 1306, in order to estimate the noise contribution in other resolution bandwidths $RBW_2-RBW_1$, or simply to obtain a more accurate measurement of the noise contribution in the same resolution bandwidth $RBW_2-RBW_1$. Adaptively, other iterations can be performed until it is determined that $RBW_1$ and $RBW_2$ were properly selected, i.e. $RBW_1$ and $RBW_2$ are wider than most of the signal power, but still narrower than the noise contribution width.

In step 1310, the in-band noise level $N(\lambda_p)$ is estimated from $N(\Delta RBW)$ obtained in step 1308, assuming that the noise contribution integrated in the spectral region corresponding to $RBW_2-RBW_1$ is representative of the noise contribution at the signal peak $\lambda_p$.

Finally, in step 1312, the noise parameter, i.e. the in-band noise, the OSNR or any other noise parameter, is determined using the estimated in-band noise level $N(\lambda_p)$ and is typically output.

The embodiments of the invention described above are intended to be exemplary only. The scope of the invention is therefore intended to be limited solely by the scope of the appended claims.

What is claimed is:

1. A method for determining a noise parameter on an input optical signal having a data-carrying signal contribution and a noise contribution within an optical signal bandwidth, the method comprising:
    obtaining at least two optical spectrum traces from said input optical signal, said optical spectrum traces being taken under different conditions such that they exhibit different non-zero signal-to-noise ratios;
    mathematically discriminating said signal contribution from said noise contribution within said optical signal bandwidth using said optical spectrum traces;
    determining an in-band noise level on said input optical signal from the discriminated noise contribution;
    determining the noise parameter from the determined in-band noise level, the noise parameter being indicative of the noise contribution within the optical signal bandwidth;
    wherein the signal contribution and the noise contribution have mutually different degrees of polarization and wherein said obtaining at least two optical spectrum traces under different conditions comprises:
    producing at least two samples of the input optical signal, under respective different polarization analysis conditions, said polarization analysis conditions corresponding to the at least two samples being arbitrary relative to said data-carrying signal contribution such that the data-carrying signal contribution is not substantially suppressed on any of said at least two samples, said at least two samples exhibiting mutually different non-zero signal-to-noise ratios; and
    acquiring an optical spectrum of each one of the at least two samples to obtain said optical spectrum traces;
    wherein said discriminating comprises:
    calculating, from said optical spectrum traces, a difference optical spectrum substantially indicative of said data-carrying signal contribution; and
    solving for said noises contribution using said optical spectrum traces and said difference optical spectrum.

2. The method as claimed in claim 1, wherein said noise parameter comprises an optical signal-to-noise ratio of the input optical signal, determined using the determined in-band noise level.

3. The method as claimed in claim 1, further comprising outputting the determined noise parameter.

4. The method as claimed in claim 1, the method further comprising:
    convoluting said first optical spectrum trace with a first and a second convolution window to obtain respective first and second integrated traces, said first convolution window corresponding to a first integration width and said second convolution window corresponding to a second integration width larger than said first integration width;
    convoluting said second optical spectrum trace with said first and said second convolution window to obtain respective third and fourth integrated traces; and
    wherein said discriminating is performed using said first, second, third and fourth integrated traces.

5. A method for determining a noise parameter on an input optical signal having a data-carrying signal contribution and a noise contribution within an optical signal bandwidth, said signal contribution being mostly polarized and said noise contribution being mostly unpolarized, the method comprising:
    acquiring a first and a second optical spectrum trace of the input optical signal corresponding to respective first and second polarization analysis conditions, said first and second polarization analysis conditions being mutually different and arbitrary relative to said data-carrying signal contribution such that the data-carrying signal contribution is not substantially suppressed on any of the optical spectrum traces, said optical spectrum traces exhibiting mutually different non-zero signal-to-noise ratios;
    mathematically discriminating said signal contribution from said noise contribution within said optical signal bandwidth based on said optical spectrum traces, said discriminating comprising:
        calculating, from said optical spectrum traces, a difference optical spectrum substantially indicative of said data-carrying signal contribution; and
        solving for said noise contribution using said optical spectrum traces and said difference optical spectrum; and
    determining said noise parameter from the discriminated noise contribution, the noise parameter being indicative of the noise contribution within the optical signal bandwidth.

6. The method as claimed in claim 5, wherein said acquiring a first and a second optical spectrum trace of the input optical signal comprises:
    polarization beam splitting said input optical signal into two samples, said samples having mutually orthogonal states of polarization; and
    acquiring an optical spectrum of each one of said samples to obtain said first and second optical spectrum traces.

7. The method as claimed in claim 6, wherein said discriminating comprises:
    subtracting said first and second optical spectrum traces from one another to obtain said difference optical spectrum, said difference optical spectrum being substantially proportional to an optical spectrum of said data-carrying signal contribution;
    estimating an optical spectrum of said signal contribution using said difference optical spectrum;
    determining an optical spectrum of said input optical signal from at least one of the first and second optical spectrum traces; and
    determining a level of said noise contribution by subtracting the estimated optical spectrum of said data-carrying signal contribution from the determined optical spectrum of said input optical signal.

8. The method as claimed in claim 5, wherein said mathematically discriminating further comprises performing a first estimation of a factor K relating the optical spectrum of said signal contribution to said difference optical spectrum, and estimating an optical spectrum of said signal contribution using said difference optical spectrum and said factor K, wherein said factor K has a magnitude of substantially less than one.

9. The method as claimed in claim 8, wherein said first estimation of a wavelength-independent factor K is calculated from levels of said first and said second optical spectrum trace at a wavelength within the optical signal bandwidth.

10. The method as claimed in claim 9, wherein said wavelength is the peak wavelength corresponding to the maximum level of the input optical signal.

11. The method as claimed in claim 8, wherein said mathematically discriminating further comprises:
    iteratively performing a second estimation of said factor K taking into account evaluated in-band noise; and
    calculating the optical spectrum of said noise contribution using said second estimation of said factor K.

12. The method as claimed in claim 5, wherein said acquiring a first and a second optical spectrum trace of the input optical signal comprises:
    power splitting said input optical signal into a first and a second sample;
    polarization analyzing said first sample and acquiring an optical spectrum of the polarization analyzed first sample to obtain said first optical spectrum trace; and
    acquiring an optical spectrum of said second sample to obtain said second optical spectrum trace, wherein said second sample is not polarization analyzed.

13. The method as claimed in claim 5, wherein said noise parameter comprises an optical signal-to-noise ratio of the input optical signal, determined using the discriminated signal and noise contributions.

14. The method as claimed in claim 5, further comprising outputting the determined noise parameter.

15. A system for determining a noise parameter on an input optical signal within an optical signal bandwidth, the system comprising:
    an input for receiving said input optical signal comprising a data-carrying signal contribution and a noise contribution within said optical signal bandwidth, said signal contribution and said noise contribution having mutually different degrees of polarization;
    a polarization optics arrangement for obtaining a first and a second sample of the input optical signal under mutually different polarization analysis conditions such that at least one of the first and the second sample is polarization analyzed, a state of polarization of the at least one polarization analyzed sample being arbitrary relative to a state of polarization of the data-carrying signal contribution such that the data-carrying signal contribution is not substantially suppressed on any of said first and said second sample;
    an optical spectrum analyzer for acquiring a first and a second optical spectrum trace respectively of the first and second samples, the first and second optical spectrum traces exhibiting mutually different non-zero signal-to-noise ratios;
    a spectrum processor adapted for mathematically discriminating said noise contribution in said input optical signal within said optical signal bandwidth based on said first and second optical spectrum traces, said spectrum processor comprising:
        a differentiator for calculating, from said optical spectrum traces, a difference optical spectrum substantially indicative of said signal contribution; and
        a noise solver for evaluating said noise contribution using calculations involving said optical spectrum traces and said difference optical spectrum; and
    a noise calculator for evaluating said noise parameter within the optical signal bandwidth from the discriminated noise contribution.

16. The system as claimed in claim 15, wherein said polarization optics arrangement comprise a polarization beam splitter for splitting said input optical signal into said first and second samples, said samples having mutually orthogonal states of polarization.

17. The system as claimed in claim 15, further comprising a polarization disturbing device for disturbing a state of polarization of said input optical signal to vary the signal to noise ratio on at least one of said optical spectrum traces such that the first and second optical spectrum traces exhibit different signal-to-noise ratios.

18. The systems as claimed in claim 15, wherein said noise parameter comprises an optical signal-to-noise ratio of the input optical signal, determined using the discriminated signal and noise contributions.

* * * * *

UNITED STATES PATENT AND TRADEMARK OFFICE
CERTIFICATE OF CORRECTION

| | | |
|---|---|---|
| PATENT NO. | : 8,787,753 B2 | Page 1 of 1 |
| APPLICATION NO. | : 13/717113 | |
| DATED | : July 22, 2014 | |
| INVENTOR(S) | : Gariepy et al. | |

It is certified that error appears in the above-identified patent and that said Letters Patent is hereby corrected as shown below:

In the claims:

In column 21, line 60, the word "noises" should read --noise--.

In column 24, the ":" at the end of the line should be replaced by a --;--.

Signed and Sealed this
Seventeenth Day of March, 2015

Michelle K. Lee
*Director of the United States Patent and Trademark Office*